United States Patent

Mochizuki et al.

[11] Patent Number: 5,949,422
[45] Date of Patent: Sep. 7, 1999

[54] SHAPE DATA COMPRESSION METHOD, SHAPE DATA DECOMPRESSION METHOD, SHAPE DATA COMPRESSION APPARATUS, AND SHAPE DATA DECOMPRESSION APPARATUS

[75] Inventors: Yoshiyuki Mochizuki; Toshiya Naka, both of Oosakashi, Japan

[73] Assignee: Matsushita Electric Industrial Co., Ltd., Japan

[21] Appl. No.: 08/901,998

[22] Filed: Jul. 29, 1997

[30] Foreign Application Priority Data

Jul. 29, 1996 [JP] Japan ...................................... 8-198718

[51] Int. Cl.⁶ .............................. G06T 15/00; G06K 9/36
[52] U.S. Cl. ........................... 345/420; 345/202; 382/232; 704/500; 704/503
[58] Field of Search ..................................... 345/202, 420; 382/232, 233; 704/500, 503

[56] References Cited

U.S. PATENT DOCUMENTS

| 5,241,395 | 8/1993 | Chen ..................................... 358/261.3 |
| 5,341,441 | 8/1994 | Maeda et al. ........................... 382/253 |
| 5,826,225 | 10/1998 | Hartung et al. ......................... 704/222 |

FOREIGN PATENT DOCUMENTS

| 7-192146 | 7/1995 | Japan . |
| 2 295 301 | 5/1996 | United Kingdom . |

OTHER PUBLICATIONS

"Frame Adaptive Finite-State Vector Quantization for Image Sequence Coding"; H. Chaur-Heh et al.; Signal Processing, Image Communication, vol. 7, No. 1, 1995, pp. 13-26 XP004047119 *abstract*.

"Compression of Hyperspectral Imagery Using The 3-D DCT and Hybrid DPCM/DCT"; G. P. Abousleman et al., IEEE Transactions of Geoscience and Remote Sensing, vol. 33, No. 1, Jan. 1, 1995, pp. 26-34, XP000500449 *abstract*.

*Primary Examiner*—Mark R. Powell
*Assistant Examiner*—Thu Nguyen
*Attorney, Agent, or Firm*—Parkhurst & Wendel

[57] ABSTRACT

A shape data compression method for image generation by three-dimensional computer graphics, including a first stage inputting a code number and a quantization precision for encoding a three-dimensional coordinate point sequence and a two-dimensional coordinate point sequence, and reading the coordinate point sequence data. A second stage includes mapping transformed point sequences in a one-dimensional space. A third stage calculates an initial apace division width based on quantization precision, divides the normal space into partial spaces and analyzes distribution of the transformed point sequences therein, decides a division width and calculates distribution of transformed point sequences in each partial space at the division width. A fourth stage obtains a mean value of coordinate values of transformed point sequences distributed in the partial space, and encodes them to produce a code book. A fifth stage generates code sequences for encoding the transformed point sequences according to the code book. And a sixth stage outputs compressed data comprising the transformation parameters for data mapping in the second stage, the code book, and the code sequences.

40 Claims, 14 Drawing Sheets

SHAPE DATA COMPRESSION METHOD, SHAPE DATA DECOMPRESSION METHOD, SHAPE DATA COMPRESSION APPARATUS, AND SHAPE DATA DECOMPRESSION APPARATUS

FIELD OF THE INVENTION

The present invention relates to a method for compressing shape data expressed by a sequence of three-dimensional coordinate points, a sequence of two-dimensional coordinate points, and a sequence of three-dimensional vectors, employed in image generation using three-dimensional computer graphics.

BACKGROUND OF THE INVENTION

When an object in which various surfaces are complicatedly combined, like a living thing (e.g., a human being or an animal) or an artifact (e.g., a car or an air plane), is processed by three-dimensional computer graphics, modeling of its shape is generally performed by three-dimensional measurement of the actual thing or a model. In recent years, since CAD (Computer Aided Design) capable of handling free surfaces has been developed, when an artifact, such as a car or an air plane, is designed using CAD, modeling of the artifact can use design data of CAD. In any case, such shape data is expressed by the following sequences: a sequence of three-dimensional coordinate points with indexes of points on the surface of the object, a sequence of three-dimensional vector points with indexes of normal vectors on the surface of the object, a sequence of three-dimensional (or two-dimensional) coordinate points with indexes of three-dimensional (or two-dimensional) texture coordinates used when a texture is mapped on the surface of the object, and a sequence of these indexes. The size of these sequences of points and vectors depends on the shape of the object. For example, a rough shape consists of several hundreds of sequences, and a minutely modeled shape consists of thousands to tens of thousands of sequences. Therefore, techniques for compressing shape data are required.

An example of a data compression technique is to reduce the amount of shape data by approximating the shape of an object using polygonal patches or parametric surfaces. This method is described in detail in Japanese Published Patent Application No. Hei. 4-202151, "Three-dimensional Shape Input Apparatus". In this method, to reduce the amount of shape data, it is necessary to reduce, i.e., thin out, vertexes of the polygonal patches or control points of the parametric surfaces. However, since the shape data is expressed by sequences of points, it is impossible to thin out control points of parametric surfaces. Therefore, the only way left is to thin out vertexes of polygons, that is, to thin out points on the surface. However, since a method for deciding which points are to be deleted from enormous number of sequences of points is not given, selection of points to be deleted cannot be performed. If it is performed in utter disregard of the shape, the shape is deformed and the shape data cannot be used at all. Further, normal vectors and texture coordinates corresponding to the points deleted must be deleted, and index sequences must be changed. Since the shape data is enormous as mentioned above, these operations are extremely difficult.

Meanwhile, another example of a data compression method is proposed in Japanese Published Patent Application No. Hei. 5-333859, "Shape Data Compression Method and Shape Data Decompression Method". In this method, it is premised that an object shape which is hierachized in parts is employed. When an object shape which is not hierachized is employed, it must be divided into parts and then hierachized. Data compression is performed for each part, and the compression method employs a transformation formula between a vertex coordinate of the shape of the part and a quantized coordinate.

In this method, although it is premised that a hierachized object shape should be used or an object shape should be hierachized, since shape data are not hierachized in most cases, hierachization must be carried out. In this prior art, described that "hierarchical division of an object shape into parts is realized by dividing a distribution area of vertexes while considering connections between these vertexes". To achieve this operation, the operator must know connections between points in point sequences, but it is impossible to know such connections in enormous number of point sequence data. Therefore, the only substantial method is to divide the object shape according to distribution of point sequences, but this division cannot secure hierachization adapted to the actual state. Even though shape data is hierachically divided into parts, the respective parts, for example, in case of a human being, upper and lower arms, trunk, and other parts, will have complicated shapes in which symmetry and the like are not secured at all.

As mentioned above, data compression is performed for each part, and the compression method employs a transformation formula between a vertex coordinate of the shape of the part and a quantized coordinate. To be specific, it is performed using a transformation formula between a partial point sequence that defines the shape of the part and a quantized coordinate sequence. According to the second prior art mentioned above, to calculate the transformation formula, a principal axis transformation must be found first. However, the principal axis transformation according to the second prior art is only applicable to an object of a simple shape, such as a cube, and a calculation method of a principal axis transformation for a complicated shape as mentioned above has not been discovered yet. Consequently, it is impossible to compress shape data in which various surfaces are combined complicatedly.

SUMMARY OF THE INVENTION

It is an object of the present invention to provide a method for compressing shape data in which a variety of surfaces are combined complicatedly, like a living thing such as a human being or an animal, or an artifact such as a car or an air plane.

It is another object of the present invention to provide an apparatus that realizes the above-mentioned shape data compression method.

It is still another object of the present invention to provide a method for decompressing shape data compressed by the above-mentioned shape data compression method.

It is a further object of the present invention to provide an apparatus that realizes the above-mentioned shape data decompression method.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a shape data compression method employed for image generation by three-dimensional computer graphics, in which shape data of an object given by one of a three-dimensional coordinate point sequence and a two-dimensional coordinate point sequence is processed, and the method comprises first stage of inputting a code number and a quantization precision for encoding one of the three-dimensional coordinate point sequence data and the two-dimensional coordinate point sequence data, and reading the coordinate point sequence data; second stage of mapping the coordinate point sequence data to transformed point sequences in a one-dimensional normal space [a,b] on the basis of transformation parameters; third stage of calculating an initial space division width on the basis of the quantization precision, dividing the one-dimensional normal space into partial spaces using the initial space division width, analyzing distribution of the transformed point sequences in each partial space, deciding a division width by adaptively changing the initial division width so that the number of partial spaces where the distribution is not 0 is approximately equal to the code number, and calculating the distribution of the transformed point sequences in each partial space at the decided division width; fourth stage of obtaining, for each of the partial spaces wherein the distribution is not 0, a mean value of coordinate values of transformed point sequences distributed in the partial space, and encoding the mean values to produce a code book; fifth stage of encoding the transformed point sequences according to the code book to generate code sequences; and sixth stage of outputting compressed data comprising the transformation parameters used for the data mapping in the second stage, the code book, and the code sequences.

According to a second aspect of the present invention, there is provided a shape data compression method employed for image generation by three-dimensional computer graphics, in which shape data of an object given by one of a three-dimensional coordinate point sequence and a two-dimensional coordinate point sequence is processed, and the method comprises first stage of inputting a code number and a quantization precision for encoding one of the three-dimensional coordinate point sequence data and the two-dimensional coordinate point sequence data, and reading the coordinate point sequence data; second stage of mapping the coordinate point sequence data to transformed point sequences in a one-dimensional normal space [a,b] on the basis of transformation parameters; third stage of calculating an initial space division width on the basis of the quantization precision, dividing the one-dimensional normal space into partial spaces using the initial space division width, analyzing distribution of the transformed point sequences in each partial space, deciding a division width by adaptively changing the initial division width so that the number of partial spaces where the distribution is not 0 is approximately equal to the code number, and calculating the distribution of the transformed point sequences in each partial space at the decided division width; fourth stage of obtaining, for each of the partial spaces wherein the distribution is not 0, a mean value of coordinate values of transformed point sequences distributed in the partial space, and encoding the mean values to produce a code book; fifth stage of encoding the transformed point sequences according to the code book to generate code sequences; sixth stage of performing run-length compression to the code sequences; and seventh stage of outputting compressed data comprising the transformation parameters used for the data mapping in the second stage, the code book, and the run-length compressed code sequences.

According to a third aspect of the present invention, there is provided a shape data compression method employed for image generation by three-dimensional computer graphics, in which shape data of an object given by a three-dimensional vector sequence is processed, and the method comprises first stage of inputting a code number and a quantization precision for encoding the three-dimensional vector sequence data, and reading the three-dimensional vector sequence data; second stage of transforming the three-dimensional vector sequence data to data sequences of two angles obtained when expressed by polar coordinates; third stage of mapping the angle data sequences to transformed point sequences in a one-dimensional normal space [a,b] on the basis of transformation parameters; fourth stage of calculating an initial space division width on the basis of the quantization precision, dividing the one-dimensional normal space into partial spaces using the initial space division width, analyzing distribution of the transformed point sequences in each partial space, deciding a division width by adaptively changing the initial division width so that the number of partial spaces where the distribution is not 0 is approximately equal to the code number, and calculating the distribution of the transformed point sequences in each partial space at the decided division width; fifth stage of obtaining, for each of the partial spaces wherein the distribution is not 0, a mean value of coordinate values of transformed point sequences distributed in the partial space, and encoding the mean values to produce a code book; sixth stage of encoding the transformed point sequences according to the code book to generate code sequences; and seventh stage of outputting compressed data comprising the transformation parameters used for the data mapping in the third stage, the code book, and the code sequences.

According to a fourth aspect of the present invention, there is provided a shape data compression method employed for image generation by three-dimensional computer graphics, in which shape data of an object given by a three-dimensional vector sequence is processed, and the method comprises first stage of inputting a code number and a quantization precision for encoding the three-dimensional vector sequence data, and reading the three-dimensional vector sequence data; second stage of transforming the three-dimensional vector sequence data to data sequences of two angles obtained when expressed by polar coordinates; third stage of mapping the angle data sequences to transformed point sequences in a one-dimensional normal space [a,b] on the basis of transformation parameters; fourth stage of calculating an initial space division width on the basis of the quantization precision, dividing the one-dimensional normal space into partial spaces using the initial space division width, analyzing distribution of the transformed point sequences in each partial space, deciding a division width by adaptively changing the initial division width so that the number of partial spaces where the distribution is not 0 is approximately equal to the code number, and calculating the distribution of the transformed point sequences in each partial space at the decided division width; fifth stage of obtaining, for each of the partial spaces wherein the distribution is not 0, a mean value of coordinate values of transformed point sequences distributed in the partial space, and encoding the mean values to produce a code book; sixth stage of encoding the transformed point sequences according to the code book to generate code sequences; seventh stage of performing run-length compression of the code sequences; eighth stage of outputting compressed data comprising the transformation parameters used for the data mapping in the third stage, the code book, and the run-length compressed code sequences.

According to a fifth aspect of the present invention, there is provided a shape data compression method employed for image generation by three-dimensional computer graphics, in which shape data of an object given by one of a three-dimensional coordinate point sequence and a two-dimensional coordinate point sequence is processed, and the method comprises first stage of inputting one of a code number and a quantization precision for encoding one of the three-dimensional coordinate point sequence data and the two-dimensional coordinate point sequence data, and reading the coordinate point sequence data; second stage of mapping the coordinate point sequence data to transformed point sequences in a one-dimensional normal space [a,b] on the basis of transformation parameters; third stage of calculating an initial space division width on the basis of the code number or the quantization precision, dividing the one-dimensional normal space into partial spaces using the initial space division width, encoding points in the transformed point sequences included in each partial space using an arithmetic expression to generate code sequences; and fourth stage of outputting compressed data comprising the transformation parameters employed for the data mapping in the second stage, parameters of the arithmetic expression employed in the third stage, and the code sequences.

According to a sixth aspect of the present invention, there is provided a shape data compression method employed for image generation by three-dimensional computer graphics, in which shape data of an object given by one of a three-dimensional coordinate point sequence and a two-dimensional coordinate point sequence is processed, and the method comprises first stage of inputting one of a code number and a quantization precision for encoding one of the three-dimensional coordinate point sequence data and the two-dimensional coordinate point sequence data, and reading the coordinate point sequence data; second stage of mapping the coordinate point sequence data to transformed point sequences in a one-dimensional normal space [a,b] on the basis of transformation parameters; third stage of calculating an initial space division width on the basis of the code number or the quantization precision, dividing the one-dimensional normal space into partial spaces using the initial space division width, encoding points in the transformed point sequences included in each partial space using an arithmetic expression to generate code sequences; fourth stage of performing run-length compression to the code sequences; and fifth stage of outputting compressed data comprising the transformation parameters employed for the data mapping in the second stage, parameters of the arithmetic expression employed in the third stage, and the run-length compressed code sequences.

According to a seventh aspect of the present invention, there is provided a shape data compression method employed for image generation by three-dimensional computer graphics, in which shape data of an object given by a three-dimensional vector sequence is processed, and the method comprises first stage of inputting one of a code number and a quantization precision for encoding the three-dimensional vector sequence data, and reading the three-dimensional vector sequence data; second stage of transforming the three-dimensional vector sequence data to data sequences of two angles obtained when expressed by polar coordinate; third stage of mapping the angle data sequences to transformed point sequences in a one-dimensional normal space [a,b] on the basis of transformation parameters; fourth stage of calculating an initial space division width on the basis of the code number or the quantization precision, dividing the one-dimensional normal space into partial spaces using the initial space division width, encoding points in the transformed point sequences included in each partial space using an arithmetic expression to generate code sequences; and fifth stage of outputting compressed data comprising the transformation parameters employed for the data mapping in the third stage, parameters of the arithmetic expression employed in the fourth stage, and the code sequences.

According to an eighth aspect of the present invention, there is provided a shape data compression method employed for image generation by three-dimensional computer graphics, in which shape data of an object given by a three-dimensional vector sequence is processed, and the method comprises first stage of inputting one of a code number and a quantization precision for encoding the three-dimensional vector sequence data, and reading the three-dimensional vector sequence data; second stage of transforming the three-dimensional vector sequence data to data sequences of two angles obtained when expressed by polar coordinate; third stage of mapping the angle data sequences to transformed point sequences in a one-dimensional normal space [a,b] on the basis of transformation parameters; fourth stage of calculating an initial space division width on the basis of the code number or the quantization precision, dividing the one-dimensional normal space into partial spaces using the initial space division width, encoding points in the transformed point sequences included in each partial space using an arithmetic expression to generate code sequences; fifth stage of performing run-length compression to the code sequences; and sixth stage of outputting compressed data comprising the transformation parameters employed for the data mapping in the third stage, parameters of the arithmetic expression employed in the fourth stage, and the run-length compressed code sequences.

According to a ninth aspect of the present invention, there is provided a shape data compression method employed for image generation by three-dimensional computer graphics, in which shape data of an object given by a three-dimensional coordinate point sequence is processed, and the method comprises first stage of inputting one of a code number and a quantization precision for encoding the three-dimensional coordinate point sequence data, and reading the three-dimensional coordinate point sequence data; second stage of mapping the three-dimensional coordinate point sequence data to transformed coordinate point sequences in a three-dimensional normal space $[a,b] \times [c,d] \times [e,f]$ on the basis of transformation parameters; third stage of calculating an initial space division width on the basis of the code number or the quantization precision, dividing the three-dimensional normal space into partial spaces using the initial space division width, encoding points in the transformed point sequences included in each partial space using an arithmetic expression to generate code sequences; and fourth stage of outputting compressed data comprising the transformation parameters employed for the data mapping in the second stage, parameters of the arithmetic expression employed in the third stage, and the code sequences.

According to a tenth aspect of the present invention, there is provided a shape data compression method employed for image generation by three-dimensional computer graphics, in which shape data of an object given by a three-dimensional coordinate point sequence is processed, and the method comprises first stage of inputting one of a code number and a quantization precision for encoding the three-dimensional coordinate point sequence data, and reading the three-dimensional coordinate point sequence data; second stage of mapping the three-dimensional coordinate point sequence data to transformed coordinate point sequences in a three-dimensional normal space $[a,b] \times [c,d] \times [e,f]$ on the basis of transformation parameters; third stage of calculating an initial space division width on the basis of the code number or the quantization precision, dividing the three-dimensional normal space into partial spaces using the initial space division width, encoding points in the transformed point sequences included in each partial space using an arithmetic expression to generate code sequences; fourth stage of performing run-length compression to the code sequences; and fifth stage of outputting compressed data comprising the transformation parameters employed for the data mapping in the second stage, parameters of the arithmetic expression employed in the third stage, and the run-length compressed code sequences.

According to an eleventh aspect of the present invention, there is provided a shape data compression method employed for image generation by three-dimensional computer graphics, in which shape data of an object given by a two-dimensional coordinate point sequence is processed, and the method comprises first stage of inputting one of a code number and a quantization precision for encoding the two-dimensional coordinate point sequence data, and reading the two-dimensional coordinate point sequence data; second stage of mapping the two-dimensional coordinate point sequence data to transformed coordinate point sequences in a two-dimensional normal space [a,b]×[c,d] on the basis of transformation parameters; third stage of calculating an initial space division width on the basis of the code number or the quantization precision, dividing the two-dimensional normal space into partial spaces using the initial space division width, encoding points in the transformed point sequences included in each partial space using an arithmetic expression to generate code sequences; and fourth stage of outputting compressed data comprising the transformation parameters employed for the data mapping in the second stage, parameters of the arithmetic expression employed in the third stage, and the code sequences.

According to a twelfth aspect of the present invention, there is provided a shape data compression method employed for image generation by three-dimensional computer graphics, in which shape data of an object given by a two-dimensional coordinate point sequence is processed, and the method comprises first stage of inputting one of a code number and a quantization precision for encoding the two-dimensional coordinate point sequence data, and reading the two-dimensional coordinate point sequence data; second stage of mapping the two-dimensional coordinate point sequence data to transformed coordinate point sequences in a two-dimensional normal space [a,b]×[c,d] on the basis of transformation parameters; third stage of calculating an initial space division width on the basis of the code number or the quantization precision, dividing the two-dimensional normal space into partial spaces using the initial space division width, encoding points in the transformed point sequences included in each partial space using an arithmetic expression to generate code sequences; fourth stage of performing run-length compression to the code sequences; and fifth stage of outputting compressed data comprising the transformation parameters employed for the data mapping in the second stage, parameters of the arithmetic expression employed in the third stage, and the run-length compressed code sequences.

According to a thirteenth aspect of the present invention, there is provided a shape data compression method employed for image generation by three-dimensional computer graphics, in which shape data of an object given by a three-dimensional vector sequence is processed, and the method comprises first stage of inputting one of a code number and a quantization precision for encoding the three-dimensional vector sequence data, and reading the three-dimensional vector sequence data; second stage of transforming the three-dimensional vector sequence data to data sequences of two angles obtained when expressed by polar coordinate; third stage of mapping the angle data sequences to transformed point sequences in a two-dimensional normal space [a,b]×[c,d] on the basis of transformation parameters; fourth stage of calculating an initial space division width on the basis of the code number or the quantization precision, dividing the two-dimensional normal space into partial spaces using the initial space division width, encoding points in the transformed point sequences included in each partial space using an arithmetic expression to generate code sequences; and fifth stage of outputting compressed data comprising the transformation parameters employed for the data mapping in the third stage, parameters of the arithmetic expression employed in the fourth stage, and the code sequences.

According to a fourteenth aspect of the present invention, there is provided a shape data compression method employed for image generation by three-dimensional computer graphics, in which shape data of an object given by a three-dimensional vector sequence is processed, and the method comprises first stage of inputting one of a code number and a quantization precision for encoding the three-dimensional vector sequence data, and reading the three-dimensional vector sequence data; second stage of transforming the three-dimensional vector sequence data to data sequences of two angles obtained when expressed by polar coordinate; third stage of mapping the angle data sequences to transformed point sequences in a two-dimensional normal space [a,b]×[c,d] on the basis of transformation parameters; fourth stage of calculating an initial space division width on the basis of the code number or the quantization precision, dividing the two-dimensional normal space into partial spaces using the initial space division width, encoding points in the transformed point sequences included in each partial space using an arithmetic expression to generate code sequences; fifth stage of performing run-length compression to the code sequences; and sixth stage of outputting compressed data comprising the transformation parameters employed for the data mapping in the third stage, parameters of the arithmetic expression employed in the fourth stage, and the run-length compressed code sequences.

According to a fifteenth aspect of the present invention, there is provided a shape data decompression method employed for image generation by three-dimensional computer graphics, and the method comprises first stage of inversely transforming code sequences of compressed shape data of an object, using a code book which is used at encoding, to generate transformed point sequences mapped to a one-dimensional normal space [a,b]; and second stage of inversely mapping the transformed sequences obtained by the inverse transformation in the first stage, and outputting one of three-dimensional coordinate point sequence data and two-dimensional coordinate point sequence data.

According to a sixteenth aspect of the present invention, there is provided a shape data decompression method for decompressing compressed shape data of an object, employed for image generation by three-dimensional computer graphics, wherein the compressed shape data is obtained by, using an arithmetic expression, encoding points of transformed point sequences in each of partial spaces, into which a one-dimensional normal space is divided, the partial space having a division width determined by one of a code number and a quantization precision used at encoding; and the method comprises first stage of inversely transforming code sequences of the compressed shape data, using an arismatic expression that is an inverse of the arithmetic expression employed at encoding, to generate transformed point sequences mapped to a one-dimensional normal space [a,b]; and second stage of inversely mapping the transformed sequences obtained by the inverse transformation in the first stage, and outputting one of three-dimensional coordinate point sequence data and two-dimensional coordinate point sequence data.

According to a seventeenth aspect of the present invention, there is provided a shape data compression apparatus for compressing shape data of an object, employed for image generation by three-dimensional computer graphics, and the apparatus comprises data input means for inputting a code number and a quantization precision for encoding shape data expressed by one of a three-dimensional coordinate point sequence and a two-dimensional coordinate point sequence, and reading the coordinate point sequence data; data mapping means for mapping the coordinate point sequence data to transformed point sequences in a one-dimensional normal space [a,b] on the basis of transformation parameters; quantization means for calculating an initial space division width on the basis of the quantization precision, dividing the one-dimensional normal space into partial spaces using the initial space division width, analyzing distribution of the transformed point sequences in each partial space, deciding a division width by adaptively changing the initial division width so that the number of partial spaces where the distribution is not 0 is approximately equal to the code number, calculating the distribution of the transformed point sequences in each partial space at the decided division width, obtaining, for each of the partial spaces wherein the distribution is not 0, a mean value of coordinate values of transformed point sequences distributed in the partial space, and encoding the mean values to produce a code book; encoding means for encoding the transformed point sequences according to the code book to generate code sequences; and data output means for outputting compressed data comprising the transformation parameters used by the data mapping means, the code book, and the code sequences.

According to an eighteenth aspect of the present invention, there is provided a shape data compression apparatus for compressing shape data of an object, employed for image generation by three-dimensional computer graphics, and the apparatus comprises data input means for inputting a code number and a quantization precision for encoding shape data expressed by a three-dimensional vector sequence, and reading the three-dimensional vector sequence data; polar coordinate transformation means for transforming the three-dimensional vector sequence data to data sequences of two angles obtained when expressed by polar coordinates; data mapping means for mapping the angle data sequences to transformed point sequences in a one-dimensional normal space [a,b] on the basis of transformation parameters; quantization means for calculating an initial space division width on the basis of the quantization precision, dividing the one-dimensional normal space into partial spaces using the initial space division width, analyzing distribution of the transformed point sequences in each partial space, deciding a division width by adaptively changing the initial division width so that the number of partial spaces where the distribution is not 0 is approximately equal to the code number, calculating the distribution of the transformed point sequences in each partial space at the decided division width, obtaining, for each of the partial spaces wherein the distribution is not 0, a mean value of coordinate values of transformed point sequences distributed in the partial space, and encoding the mean values to produce a code book; encoding means for encoding the transformed point sequences according to the code book to generate code sequences; and data output means for outputting compressed data comprising the transformation parameters used by the data mapping means, the code book, and the code sequences.

According to a ninteenth aspect of the present invention, there is provided a shape data compression apparatus for compressing shape data of an object, employed for image generation by three-dimensional computer graphics, and the apparatus comprises data input means for inputting one of a code number and a quantization precision for encoding shape data expressed by one of a three-dimensional coordinate point sequence and a two-dimensional coordinate point sequence, and reading the coordinate point sequence data; data mapping means for mapping the coordinate point sequence data to transformed point sequences in a one-dimensional normal space [a,b] on the basis of transformation parameters; quantization means for calculating an initial space division width on the basis of the code number or the quantization precision, dividing the one-dimensional normal space into partial spaces using the initial space division width, and encoding points in the transformed point sequences included in each partial space using an arithmetic expression to generate code sequences; and data output means for outputting compressed data comprising the transformation parameters employed by the data mapping means, parameters of the arithmetic expression employed for the encoding, and the code sequences.

According to a twentieth aspect of the present invention, there is provided a shape data compression apparatus for compressing shape data of an object, employed for image generation by three-dimensional computer graphics, and the apparatus comprises data input means for inputting one of a code number and a quantization precision for encoding shape data expressed by a three-dimensional vector sequence, and reading the three-dimensional vector sequence data; polar coordinate transformation means for transforming the three-dimensional vector sequence data to data sequences of two angles obtained when expressed by polar coordinate; data mapping means for mapping the angle data sequences to transformed point sequences in a one-dimensional normal space [a,b] on the basis of transformation parameters; quantization means for calculating an initial space division width on the basis of the code number or the quantization precision, dividing the one-dimensional normal space into partial spaces using the initial space division width, and encoding points in the transformed point sequences included in each partial space using an arithmetic expression to generate code sequences; and data output means for outputting compressed data comprising the transformation parameters employed by the data mapping means, parameters of the arithmetic expression employed for the encoding, and the code sequences.

According to a twenty-first aspect of the present invention, there is provided a shape data compression apparatus for compressing shape data of an object, employed for image generation by three-dimensional computer graphics, and the apparatus comprises data input means for inputting one of a code number and a quantization precision for encoding shape data expressed by a three-dimensional coordinate point sequence, and reading the three-dimensional coordinate point sequence data; data mapping means for mapping the three-dimensional coordinate point sequence data to transformed coordinate point sequences in a three-dimensional normal space [a,b]×[c,d]×[e,f] on the basis of transformation parameters; quantization means for calculating an initial space division width on the basis of the code number or the quantization precision, dividing the three-dimensional normal space into partial spaces using the initial space division width, and encoding points in the transformed point sequences included in each partial space using an arithmetic expression to generate code sequences; and data output means for outputting compressed data comprising the transformation parameters employed by the data mapping means, parameters of the arithmetic expression employed for the encoding, and the code sequences.

According to a twenty-second aspect of the present invention, there is provided a shape data compression apparatus for compressing shape data of an object, employed for image generation by three-dimensional computer graphics, and the apparatus comprises data input means for inputting one of a code number and a quantization precision for encoding shape data expressed by a two-dimensional coordinate point sequence, and reading the two-dimensional coordinate point sequence data; data mapping means for mapping the two-dimensional coordinate point sequence data to transformed coordinate point sequences in a two-dimensional normal space [a,b]×[c,d] on the basis of transformation parameters; quantization means for calculating an initial space division width on the basis of the code number or the quantization precision, dividing the two-dimensional normal space into partial spaces using the initial space division width, and encoding points in the transformed point sequences included in each partial space using an arithmetic expression to generate code sequences; and data output means for outputting compressed data comprising the transformation parameters employed by the data mapping means, parameters of the arithmetic expression employed for the encoding, and the code sequences.

According to a twenty-third aspect of the present invention, there is provided a shape data compression apparatus for compressing shape data of an object, employed for image generation by three-dimensional computer graphics, and the apparatus comprises data input means for inputting one of a code number and a quantization precision for encoding shape data expressed by a three-dimensional vector sequence, and reading the three-dimensional vector sequence data; polar coordinate transformation means for transforming the three-dimensional vector sequence data to data sequences of two angles obtained when expressed by polar coordinate; data mapping means for mapping the angle data sequences to transformed point sequences in a two-dimensional normal space [a,b]×[c,d] on the basis of transformation parameters; quantization means for calculating an initial space division width on the basis of the code number or the quantization precision, dividing the two-dimensional normal space into partial spaces using the initial space division width, and encoding points in the transformed point sequences included in each partial space using an arithmetic expression to generate code sequences; and data output means for outputting compressed data comprising the transformation parameters employed by the data mapping means, parameters of the arithmetic expression employed for the encoding, and the code sequences.

According to a twenty-fourth aspect of the present invention, there is provided a shape data decompression apparatus for decompressing compressed shape data of an object, employed for image generation by three-dimensional computer graphics, and the apparatus comprises data input means for inputting compressed shape data of an object; inverse transformation means for inversely transforming code sequences of the compressed shape data, using a code book which is used at encoding, to generate transformed point sequences mapped to a one-dimensional normal space [a,b]; and inverse quantization means for inversely mapping the transformed sequences obtained by the inverse transformation in the first stage, and outputting one of three-dimensional coordinate point sequence data and two-dimensional coordinate point sequence data.

According to a twenty-fifth aspect of the present invention, there is provided a shape data decompression apparatus for decompressing compressed shape data of an object, employed for image generation by three-dimensional computer graphics, wherein the compressed shape data is obtained by, using an arithmetic expression, encoding points of transformed point sequences in each of partial spaces, into which a one-dimensional normal space is divided, the partial space having a division width determined by one of a code number and a quantization precision used at encoding; and the apparatus comprises inverse transformation means for inversely transforming code sequences of the compressed shape data, using an arithmetic expression that is an inverse of the arithmetic expression employed at encoding, to generate transformed point sequences mapped to a one-dimensional normal space [a,b]; and inverse quantization means for inversely mapping the transformed sequences obtained by the inverse transformation in the first stage, and outputting one of three-dimensional coordinate point sequence data and two-dimensional coordinate point sequence data.

DETAILED DESCRIPTION OF THE PREFERRED EMBODIMENTS

[Embodiment 1]

Figure 1:
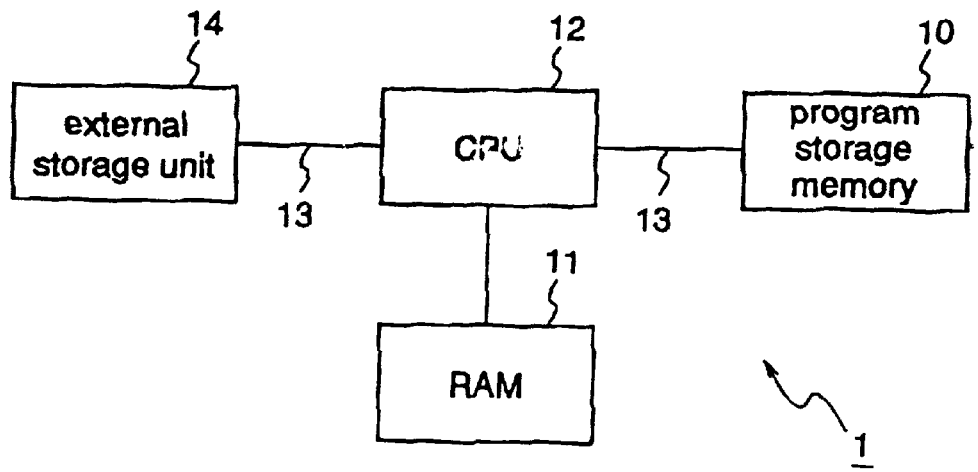
FIG. 1 is a block diagram illustrating a shape data compression apparatus according to the present invention

FIG. 1 is a block diagram illustrating a structure of a shape data compression apparatus according to a first embodiment of the present invention. The shape data compression apparatus comprises a program storage memory 10 storing a program used for compression, a RAM (Random Access Memory) 11 storing a processing result, and a CPU (Central Processing Unit) 12 controlling the program storage memory 10 and the RAM 11. These memory 10, RAM 11, and CPU 12 are connected with each other through a data bus 13. Further, an external storage unit 14 for fetching the content of the RAM 11 and reading information, such as a program, from the outside is connected to the CPU 12.

Figure 2:
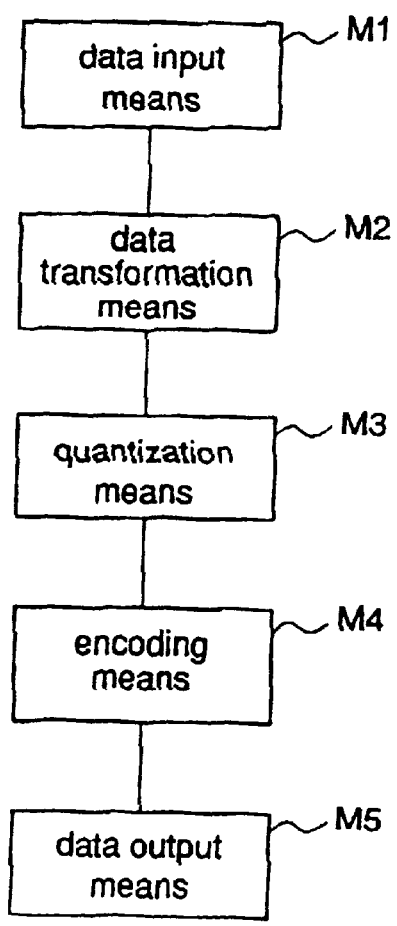
FIG. 2 is a block diagram of the shape data compression apparatus in the processing level.

FIG. 2 is a block diagram illustrating the shape data compression apparatus in its process level. In FIG. 2, M1 is a data input means, M2 is a data transformation means, M3 is a quantization means, and M4 is a code conversion means.

Figure 3:
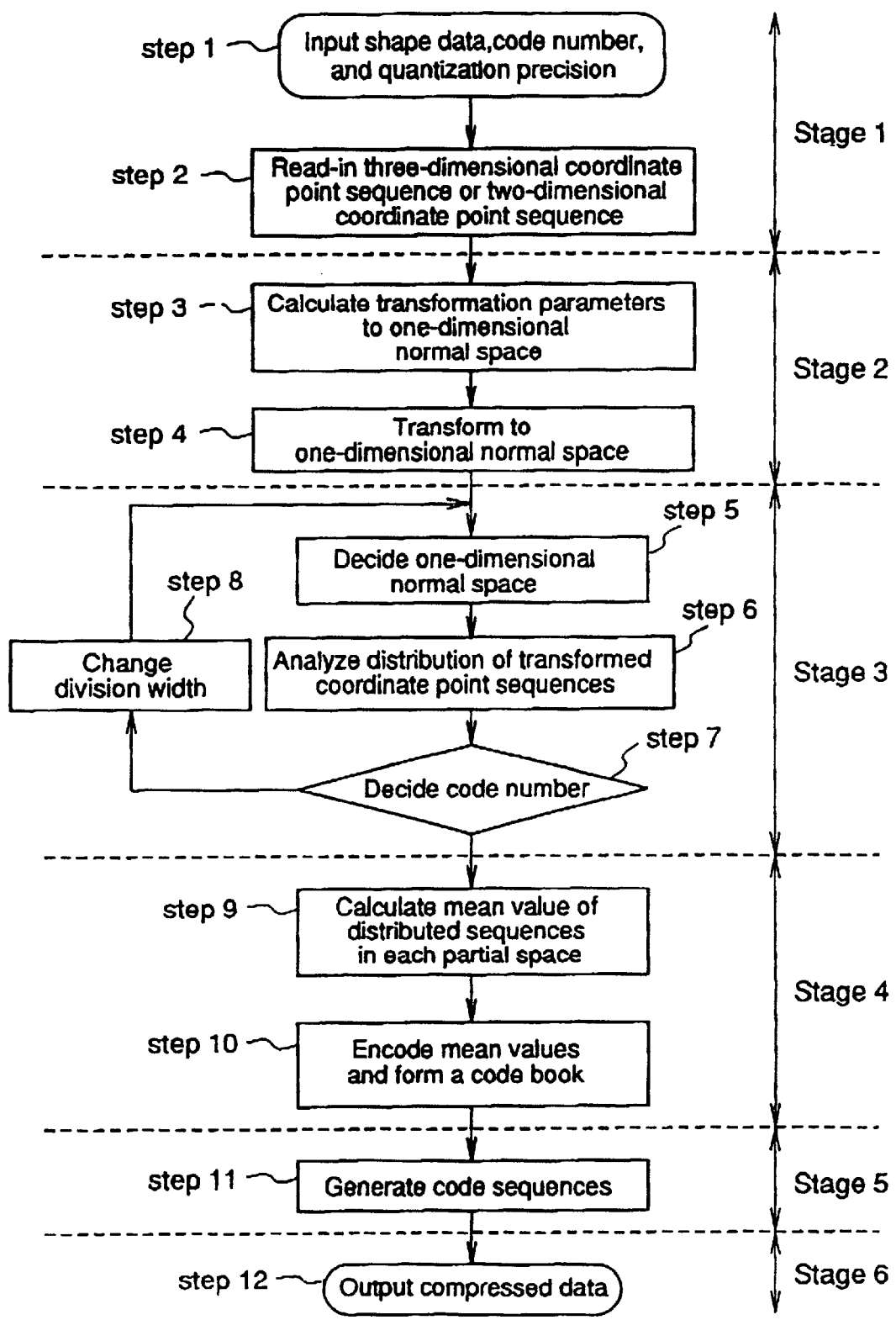
FIG. 3 is a flowchart of a shape data compression method according to a first embodiment of the invention.

FIG. 3 is a flowchart showing process steps in a shape data compression method according to the first embodiment of the invention. As shown in FIG. 3, the whole process consists of first to sixth stages. The first stage comprises steps 1 and 2, the second stage comprises steps 3 and 4, the third stage comprises steps 5, 6, 7, and 8, the fourth stage comprises steps 9 and 10, the fifth stage comprises step 11, and the sixth stage comprises step 12.

Hereinafter, the respective steps will be described in detail.

In step 1, shape data, code number, and quantization precision are input. Target shape data is given by a format shown in FIG. 12. That is, the shape data is composed of the following sequences: a sequence of points on the surface of an object (a sequence of three-dimensional coordinate points), a sequence of normal vectors (a sequence of three-dimensional vectors), a sequence of texture coordinate points (a sequence of two-dimensional coordinate points or a sequence of three-dimensional coordinate points), and a sequence of indexes. Although the respective sequences are clearly separated in FIG. 12, when identifications showing the kinds of data forming the sequences, i.e., point sequences, normal vectors, and texture coordinates, are added, a format in which these data are mixed may be used. It is seldom that indexes of sequences are clearly expressed. Usually, they are expressed by an agreement that "indexes are given to the respective sequences in the shape data from the uppermost one downward".

In step 2, from the shape data, the three-dimensional coordinate point sequence or the two-dimensional coordinate point sequence is read as sequences of respective coordinate values. To be specific, in the shape data, the three-dimensional coordinate point sequence of the points on the surface of the object and the texture coordinate point sequence are regarded as processing targets, and reading is carried out so that these coordinate point sequences are divided into sequences of respective coordinate values. However, when plural data are mixed in the shape data, reading is carried out while identifying each data with the identifiers given to the respective data.

In step 3, parameters for transforming the coordinate value sequences read in step 2 to a one-dimensional normal space [a,b] are calculated. Parameters employed here are a parallel moving amount and a scale conversion amount. With respect to the parallel moving amount, a mean value of coordinate values in each coordinate value sequence is obtained, and (mean value)−(a+b)/2 is given as a parallel moving amount of each coordinate value sequence. With respect to the scale conversion amount, when different scale conversion amounts are used for the respective coordinate values, a maximum value m of absolute values of coordinate values in each coordinate value sequence is obtained, and (b−a)2m is given as a scale conversion amount for each coordinate value sequence. When a common scale conversion amount is used for all the coordinate values, a maximum value M of the maximum values m of the respective coordinate value sequences is obtained, and (b−a)/2M given as a common scale conversion amount.

In step 4, the coordinate value sequences are transformed (mapped) to a one-dimensional normal space to generate sequences of transformed points. A transformation formula is given by (scale conversion amount)×x−(parallel moving amount), wherein x is the coordinate value to be transformed. The scale conversion amount and the parallel moving amount employed in the transformation formula are those obtained in step 3. This transformation formula is applied to the respective coordinate value sequences to obtain transformed sequences. The order of the coordinate value sequences is stored.

Figure 4:
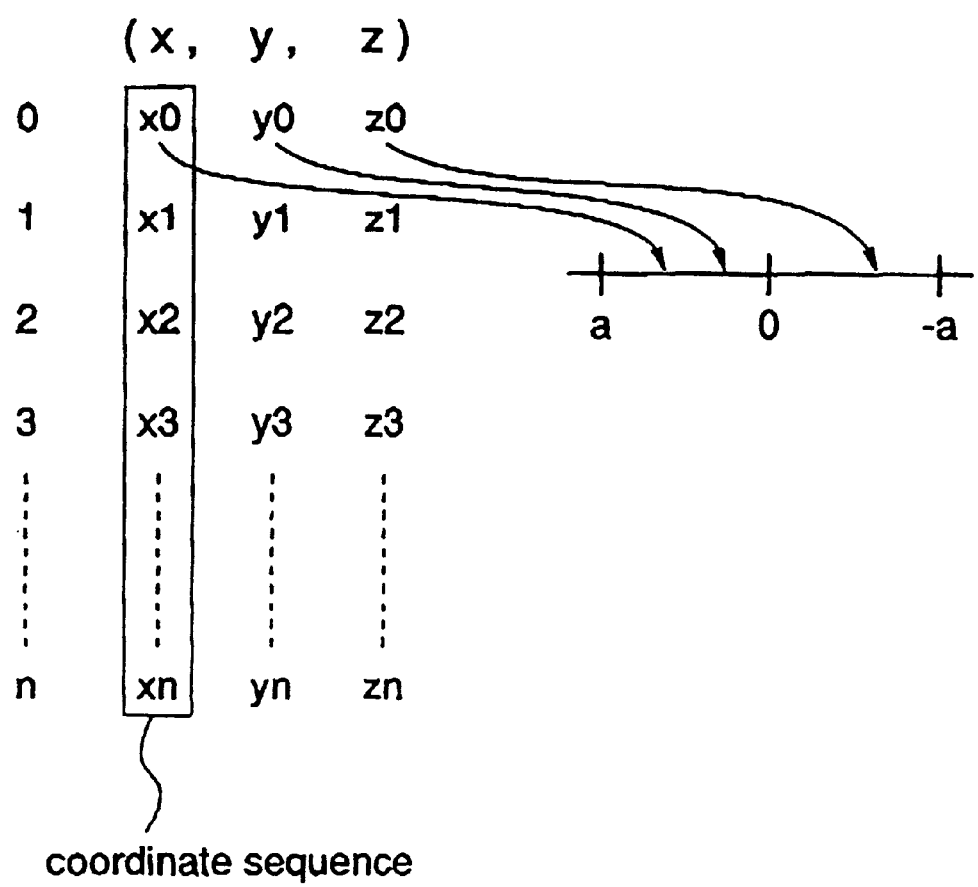
FIG. 4 is a diagram for explaining a process for transforming sequences of coordinate values to a one-dimensional normal space.

FIG. 4 is a diagram for explaining the process of transforming the coordinate value sequences to a one-dimensional normal space. In FIG. 4, coordinate values are arranged in the horizontal direction, and a column of coordinate values from 0 to n is processed as a single coordinate value sequence. The coordinate values in each coordinate value sequence are transformed according to the above-mentioned transformation formula, generating sequences of transformed points.

In step 5, the one-dimensional normal space is divided into partial spaces (sub-intervals). In the loop from step 5 to step 8, an initial division width is given by (quantization precision)×(scale conversion amount). From the second division forward, a division width decided in step 8, which will be described later, is used.

In step 6, distribution of the transformed point sequences in each partial space is investigated. To be specific, the number of transformed point sequences included in each partial space is obtained. At this time, an identifier to discriminate between a partial space where the distribution is not 0 and a partial space where the distribution is 0 is given to each partial space.

In step 7, according to the identifiers given to the respective partial spaces in step 6, the number of partial spaces where the distribution is not 0 is counted, and the number is compared with the code number which is input in step 1. When the number of partial spaces where the distribution is not 0 is larger than the input code number, step 8 is executed.

In step 8, the division width is changed by adding a small amount to the original division width. This small amount is determined on the basis of the initial division width. For example, 5% of the initial division width is added.

In step 7, when the number of partial spaces where the distribution is not 0 is smaller than the input code number, step 7 is followed by step 9. In step 9, for each partial space where the distribution is not 0, a mean value of distribution is obtained.

In step 10, mean values of respective partial spaces obtained in step 9 are regarded as representatives of these partial spaces, and the representatives are coded using any of the following coding methods.

① Code 0 is assigned to the partial space where the distribution is not 0, which is nearest to (a+b)/2. For the other partial spaces where the distribution is not 0, codes 1 to n−1 (n=number of partial spaces where the distribution is not 0) are assigned alternately to those before and after the partial space of code 0.

② Codes 0 to n−1 are assigned to partial spaces where the distribution is not 0, from one nearest to a toward b.

③ Codes 0 to n−1 are assigned to partial spaces where the distribution is not 0, from one nearest to b toward a.

The result of the above-mentioned processing is stored as a code block. In the coding method ①, decision of distance, i.e., nearness to (a+b)/2, is based on the smallest value of differences between all the elements in the partial space and the absolute value of (a+b)/2.

In step 11, the codes assigned in step 10 are given to the transformed point sequences distributed in the respective partial spaces to generate code sequences of the respective coordinate values. These code sequences are generated according to the order of the coordinate value sequences stored in step 4.

In step 12, compressed data comprising the transformation parameters obtained in step 3, the code book obtained in step 10, and the code sequences is output.

As described above, according to the first embodiment of the present invention, a three-dimensional coordinate point sequence or a two-dimensional coordinate point sequence, which shows an object shape, is transformed to point sequences in a one-dimensional normal space, and the one-dimensional normal space is divided into partial spaces (sub-intervals). Then, distribution of the transformed point sequences in each sub-interval is investigated, and the division width of the sub-intervals is appropriately changed. Then, mean values of coordinate values of point sequences in the respective sub-intervals at a decided division width are encoded and, on the basis of the codes so obtained, the respective transformed point sequences are encoded. Therefore, one coordinate can be expressed by bits of the code number in the code book. When shape data which is given as floating points or double-precision floating points and requires a data region of 32 bits or 64 bits for one coordinate or element is subjected to shape data compression according to the present invention, one coordinate value can be expressed by a bit number equal to the code number, although 96 bits per point is required in case of a three-dimensional coordinate whose coordinate value is given by 32 bits. Therefore, according to the invention, shape data compression is possible when the code number is smaller than 32 bits. As a result, shape data expressing an object having complicated surfaces can be compressed with high efficiency.

In actual measurement, when shape data of an object (human being) having 13219 points on its surface is processed, a code number of 9 bits for each coordinate, i.e., 512, secures a result that is visually equal to the original shape. With respect to numerical data, a maximum error appears only in the second place below the decimal point. In this case, the compression ratio to this data is about 27/96.

[Embodiment 2]

Figure 5:
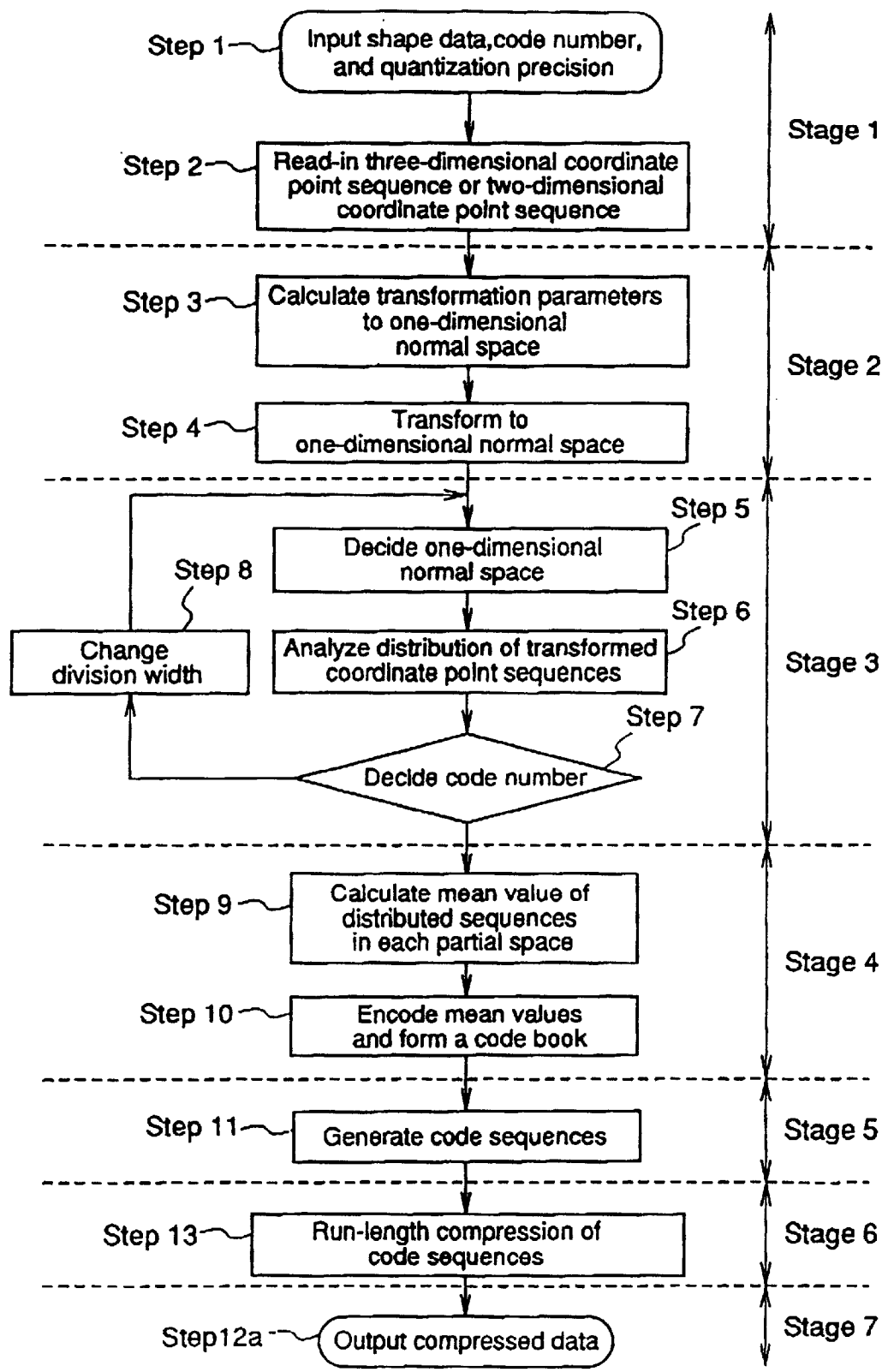
FIG. 5 is a flowchart of a shape data compression method according to a second embodiment of the invention.

A shape data compression method according to a second embodiment of the present invention will be described with reference to FIG. 5. FIG. 5 is a flowchart for explaining process steps in the shape data compression method. As shown in FIG. 5, the whole process consists of first to seventh stages. The first stage comprises steps 1 and 2, the second stage comprises steps 3 and 4, the third stage comprises steps 5, 6, 7, and 8, the fourth stage comprises steps 9 and 10, the fifth stage comprises step 11, the sixth stage comprises step 13, and the seventh stage comprises step 12a.

Steps 1 to 11 are identical to those already described with respect to the first embodiment and, therefore, do not require repeated description. Steps 13 and 12a will be described in detail hereinafter.

In step 13, for the code sequences of the respective coordinate values generated in step 11, run-length compression is performed to each coordinate value, generating compressed code sequences.

In step 12a, compressed data comprising the transformation parameters obtained in step 3, the code book obtained in step 10, and the compressed code sequences is output.

As described above, according to the second embodiment of the present invention, the code sequences obtained in step 11 are subjected to run-length compression, and compressed data comprising the transformation parameters obtained in step 3, the code book obtained in step 10, and the compressed code sequences is output. Therefore, higher compression is realized.

[Embodiment 3]

Figure 6:
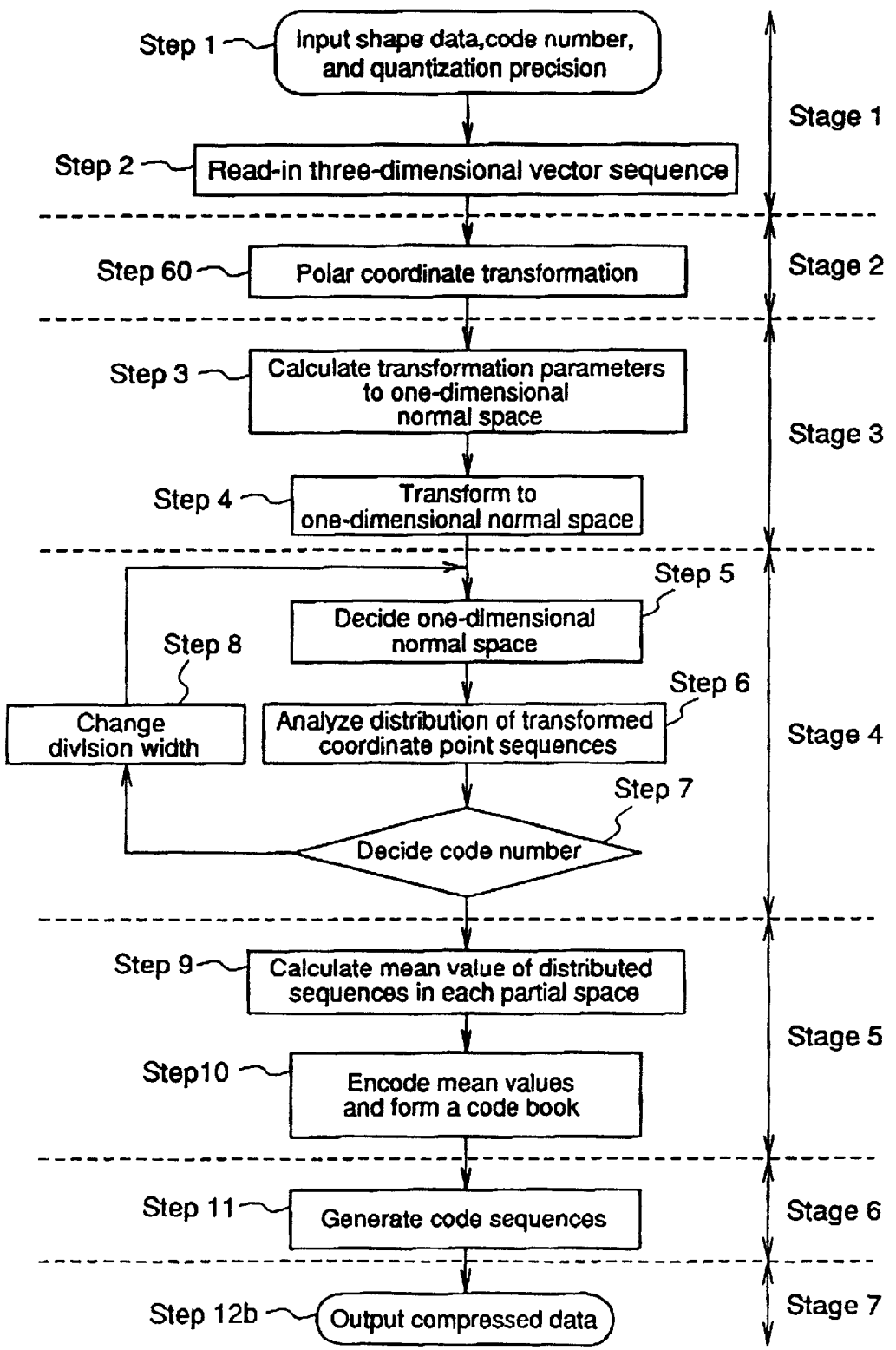
FIG. 6 is a flowchart of a shape data compression method according to a third embodiment of the invention.

A shape data compression method according to a third embodiment of the present invention will be described hereinafter with reference to FIG. 6. FIG. 6 is a flowchart for explaining process steps in the shaped data compression method according to the third embodiment. As shown in FIG. 6, the whole process consists of first to seventh stages. The first stage comprises steps 1 and 2a, the second stage comprises step 60, the third stage comprises steps 3 and 4, the fourth stage comprises steps 5, 6, 7, and 8, the fifth stage comprises steps 9 and 10, the sixth stage comprises step 11, and the seventh stage comprises step 12b. The respective steps will be described in detail.

Step 1 is identical to step 1 already described for the first embodiment.

In step 2a, the normal vector sequence (three-dimensional vector sequence) is read from the shape data. When plural data are mixed in the shape data, reading is carried out while identifying each data using identifiers given to the respective data.

In step 60, each vector in the three-dimensional vector sequence is normalized to length 1, and each normalized vector is transformed to a polar coordinate; providing two angles respectively formed with the x axis and the z axis. As a result, sequences of two angle data are generated. The original order is stored.

In step 3, parameters for transforming the angle data sequences generated in step 60 to a one-dimensional normal space [a,b] are calculated. A parallel moving amount and a scale conversion amount are the parameters. To obtain the parallel moving amount, a mean value of angle data in each angle data sequence is calculated, and (mean value)−(a+b)/2 is given as a parallel moving amount of each sequence. The scale conversion amount is obtained as follows. When different scale conversion amounts are used for the respective angle data, a maximum value m of absolute values of angle data in each angle data sequence is obtained, and (b−a)/2m is given as a scale conversion amount for each sequence. When a common scale conversion amount is used for the respective angle data, a maximum value M of the maximum values m of the respective angle data sequences is obtained, and (b−a)/2M is given as a common scale conversion amount.

In step 4, the respective angle data sequences are transformed to a one-dimensional normal space to generate sequences of transformed points. A transformation formula is given by (scale conversion amount)×x−(parallel moving amount), wherein x is the angle to be transformed. The scale conversion amount and the parallel moving amount employed in the transformation formula are those obtained in step 3. This transformation formula is applied to the respective coordinate value sequences to obtain transformed sequences. The order of the angle data sequences is stored.

Step 5 is identical to step 5 already described for the first embodiment. In the loop from step 5 to step 8, the initial division width is given by (quantization precision)×(scale conversion amount). From the second division forward, a division width decided in step 8 described later is used.

Step 6 is carried out in the same manner as step 6 according to the first embodiment.

Step 7 is carried out in the same manner as step 7 according to the first embodiment. When the number of partial spaces where the distribution is not 0 is larger than the initially input code number, the process proceeds to step 8. When the number of partial spaces is smaller than the code number, the process proceeds to step 9.

Steps 8 to 10 are identical to step 11 according to the first embodiment, wherein transformed sequences are generated in the order of the angle data sequences stored in step 4.

In step 12b, compressed data comprising the transformation parameters obtained in step 3, the code book obtained in step 10, and the code sequences generated in step 11 is output.

As described above, according to the third embodiment of the present invention, the three-dimensional vector sequence read in step 2a is transformed to polar coordinates in step 60, whereby two-dimensional data sequences (sequences of two angle data) are generated. These two-dimensional data sequences are transformed to point sequences in a one-dimensional normal space, and the one-dimensional normal space is divided into partial spaces (sub-intervals). Thereafter, distribution of the transformed point sequences in each sub-interval is investigated, and the division width of the sub-intervals is appropriately changed. Then, mean values of coordinate values of point sequences in the respective sub-intervals at a decided division width are encoded, and the transformed point sequences are encoded on the basis of the codes of the mean values. Therefore, in case of normal vectors, the data amount is compressed to $2/3$ by the polar coordinate transformation. As a result, shape data expressing an object having complicated surfaces can be compressed with high efficiency.

An experiment was carried out for data having 14712 normal vectors using the data compression method according to this third embodiment. The result of the experiment is as follows. When the code number is 7 bit for each angle data, i.e., 128, a shape visually equal to the original shape is obtained. With respect to numerical data, a maximum error appears only in the second place below the decimal point. in this case, the compression ratio to this data is about 14/96.

[Embodiment 4]

Figure 7:
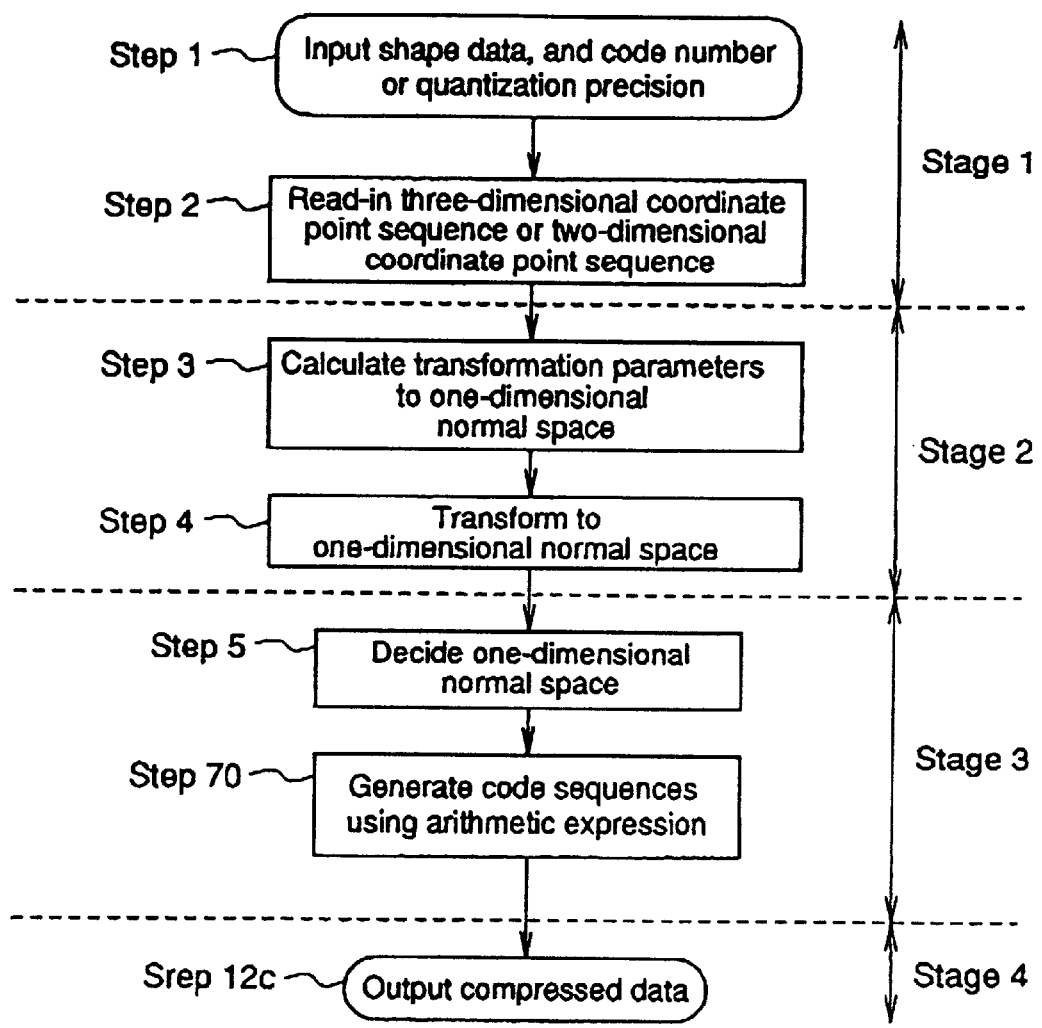
FIG. 7 is a flowchart of a shape data compression method according to a fourth embodiment of the invention.

A shape data compression method according to a fourth embodiment of the present invention will be described with reference to FIG. 7. FIG. 7 is a flowchart for explaining process steps in the shaped data compression method according to the fourth embodiment. As shown in FIG. 7, the whole process consists of first to fourth stages. The first stage comprises steps 1 and 2, the second stage comprises steps 3 and 4, the third stage comprises steps 5 and 70, and the fourth stage comprises step 12c.

Hereinafter, these process steps will be described in detail. Steps 1 to 4 are identical to those already described for the first embodiment and, therefore, do not require repeated description.

In step 5, division of the one-dimensional normal space is performed. When quantization precision is given in step 1, the one-dimensional normal space is divided into equal sub-intervals using a value obtained by transforming the quantization precision with the scale conversion amount calculated in step 3.

As an example, a division method when the code number is n+1 will be described using FIG. 14. Initially, the abscissa is divided into equal sub-intervals, i.e., sub-intervals, using the code number, and code values are assigned to the respective sub-intervals using the following methods.

① Codes 0 to n are assigned to the sub-intervals, from one nearest to a toward b.

② Codes 0 to n are assigned to the sub-intervals, from one nearest to b toward a.

This assignment of codes should be performed so that the sub-intervals can be calculated from the codes in a simple formula, and the assignment method is uniquely decided in advance.

Hereinafter, function p(x) satisfying the following conditions is called a space division function.

① monotone increasing

② p(a)=a and p(b)=b

Division boundaries of the one-dimensional normal space are given by values obtained by assigning values of the equal-division boundaries on the abscissa to the space division function p.

Figure 14:
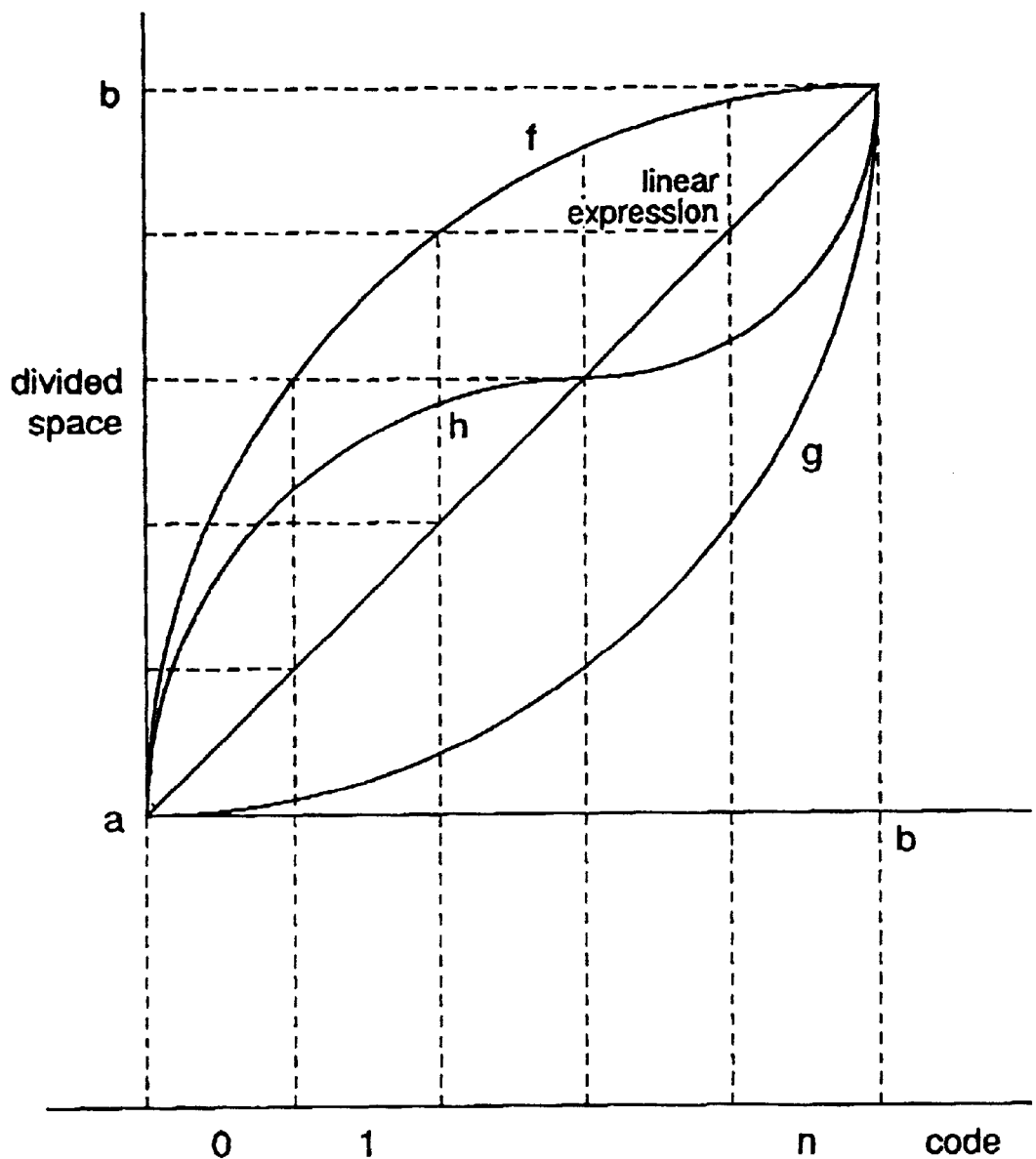
FIG. 14 is a diagram for explaining space division functions for dividing a normal space into partial spaces.

For example, when a linear expression shown in FIG. 14 is used, the one-dimensional normal space is divided into equal sub-intervals. When function f curving upward is used, the division width decreases from a toward b. Conversely, when function g curving downward is used, the division width increases from a toward b. Further, when function h curving upward and downward is used, the division width is narrow in a region near the changing point of the curvature, and it is wide at both ends. In this way, by selecting a space division function adaptively to input data, various manners of divisions are realized. As a result, the one-dimensional normal space is divided into partial spaces. In this fourth embodiment, the space division function is suggestively decided in advance.

In step 70, when the one-dimensional normal space is divided into equal sub-intervals in step 5, for each element in the transformed point sequences, a sub-interval including the element is obtained. Next, a code value assigned to the sub-interval is given to the element, generating a code sequence for each coordinate value sequence. When the space division function p is used in step 5, since an inverse function of p surely exists, this inverse function is obtained first. Then, each element in the transformed point sequences is transformed with the inverse function, and a code value assigned to a sub-interval including the transformed value is given to the transformed value, thereby generating a code sequence for each coordinate value sequence.

In step 12c, compressed data comprising the transformation parameters calculated in step 3, the arithmetic parameter specifying the space division function p, and the code sequences is output.

When a plurality of shape data are compressed, a one-dimensional normal space and an arithmetic parameter are common to all the shapes, and a piece of data describing the arithmetic parameter is stored. In this case, it is not necessary to add the arithmetic parameter to compressed data of each shape.

As described above, according to the fourth embodiment of the invention, since division of the one-dimensional normal space is performed using the code number or quantization precision input in step 1, formation of a code book can be dispensed with. Hence, a high compression ratio is achieved even when a code book changes for every data, and the calculation speed is increased.

[Embodiment 5]

A shape data compression method according to a fifth embodiment of the invention will be described using FIG. 8.

Figure 8:
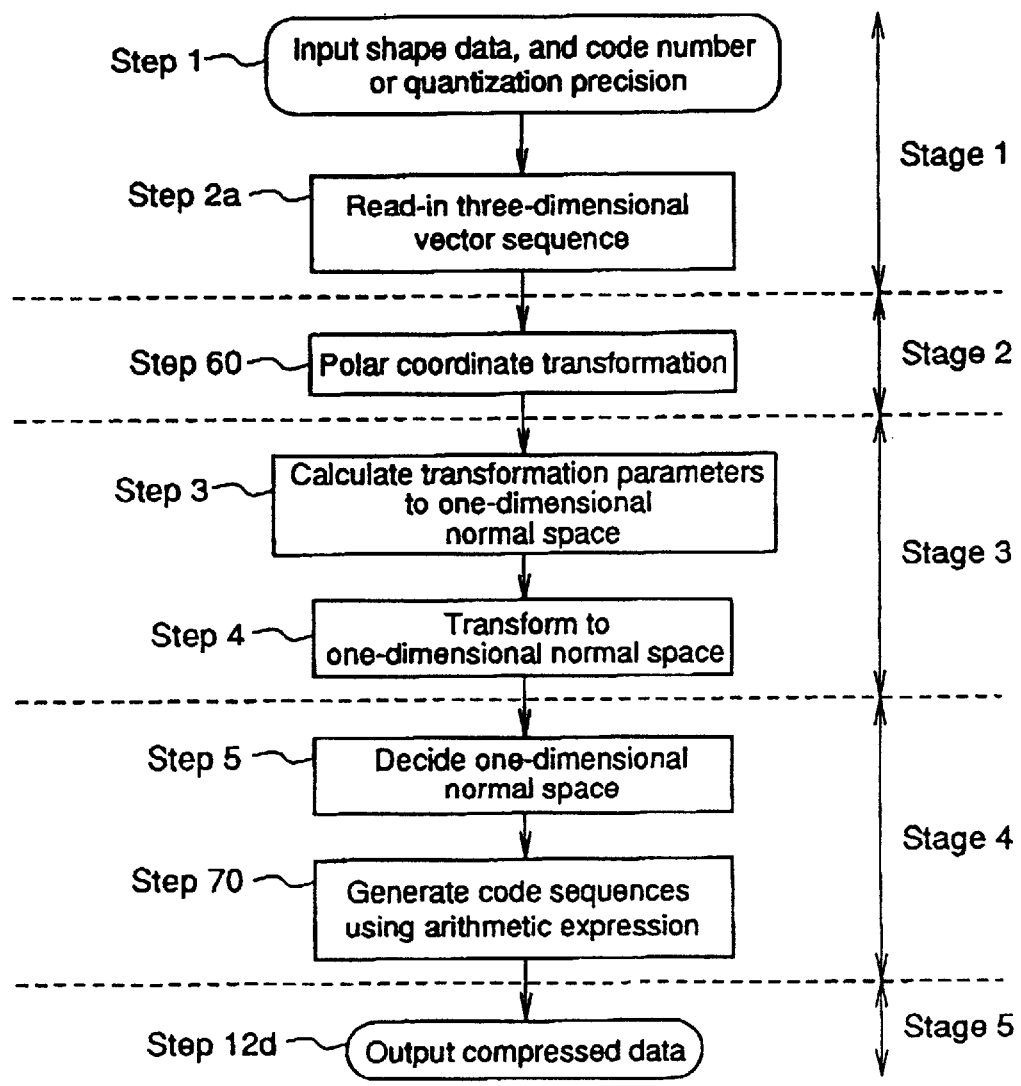
FIG. 8 is a flowchart of a shape data compression method according to a fifth embodiment of the invention.

FIG. 8 is a flowchart for explaining process steps in the shaped data compression method according to the fifth embodiment. As shown in FIG. 8, the whole process consists of first to fifth stages. The first stage comprises steps 1 and 2a, the second stage comprises step 60, the third stage comprises steps 3 and 4, the fourth stage comprises steps 5 and 70, and the fifth stage comprises step 12d.

Hereinafter, these process steps will be described in detail. Steps 1 through 5 are identical to those already described for the third embodiment and, therefore, do not require repeated description.

In step 70, when the one-dimensional normal space has been divided into equal intervals in step 5, for each element in the transformed point sequences, a sub-interval including the element is obtained. Next, a code value assigned to the interval is given to the element, generating a code sequence for each angle data sequence. When the space division function p is used in step 5, since an inverse function of p surely exists, this inverse function is obtained first. Then, each element in the transformed point sequences is transformed with the inverse function, and a code value assigned to an interval including the transformed value is given to the transformed value, thereby generating a code sequence for each angle data sequence.

In step 12d, compressed data comprising the transformation parameters calculated in step 3, the space division function (arithmetic expression), and the code sequences is output.

As described above, according to the fifth embodiment of the invention, after reading the three-dimensional vector sequence as in the method according to the fourth embodiment, this vector sequence is transformed to polar coordinates in the same manner as step 60 according to the third embodiment, so that formation of a code book can be dispensed with. Hence, a high compression ratio is achieved even when a code book changes for every data, and the calculation speed is increased. In addition, in case of normal vectors, the data amount is compressed to $2/3$ by the polar coordinate transformation. As a result, shape data expressing an object having complicated surfaces can be compressed with high efficiency.

[Embodiment 6]

Figure 9:
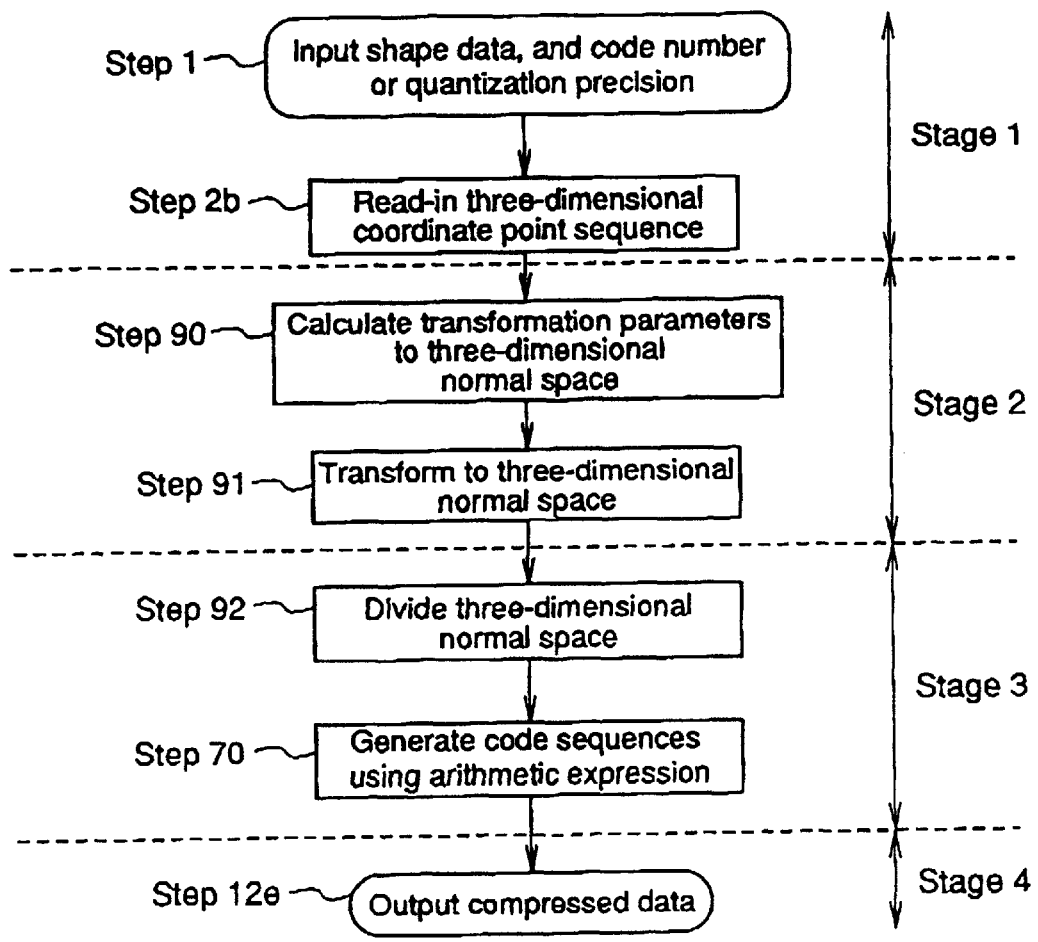
FIG. 9 is a flowchart of a shape data compression method according to a sixth embodiment of the invention.

A shape data compression method according to a sixth embodiment of the present invention will be described using FIG. 9. FIG. 9 is a flowchart for explaining process steps in the data compression method according to this sixth embodiment. In FIG. 9, the whole process consists of first to fourth stages. The first stage comprises steps 1 and 2b, the second stage comprises steps 90 and 91, the third stage comprises steps 92 and 70, and the fourth stage comprises step 12e.

Step 1 is carried out in the same manner as step 1 according to the first embodiment. However, the code number and the quantization error can be independently given to each coordinate.

In step 2b, from the shape data, the three-dimensional coordinate point sequence is read as sequences of respective coordinate values. To be specific, in the shape data, the three-dimensional coordinate point sequence of points on the surface of the object and the three-dimensional texture coordinate point sequence are regarded as processing targets, and reading is carried out so that these coordinate point sequences are divided into sequences of respective coordinate values. When plural data are mixed in the shape data, reading is carried out while identifying each data using Identifiers given to the respective data.

In step 90, parameters for transforming the three-dimensional coordinate point sequences read in step 2b to a three-dimensional normal space [a,b]×[c,d]×[e,f] are calculated. The parameters are a parallel moving amount and a scale conversion amount. To obtain the parallel moving amount, d mean value of coordinate values in each coordinate value sequence is calculated, and (mean value of first coordinate)−(a+b)/2, (mean value of second coordinate)−(c+d)/3, and (mean value of third coordinate)−(e+f)/2 are given as a parallel moving amount for each coordinate value sequence. With respect to the scale conversion amount, a maximum value m of absolute values of coordinate values in each coordinate value sequence is obtained, and different scale conversion amounts are used for the respective coordinate values.

In step 91, the respective coordinate value sequences are transformed to a three-dimensional normal space, generating transformed point sequences. A transformation formula is given by (scale conversion amount)×x−(parallel moving amount), wherein x is the coordinate value to be transformed. The scale conversion amount and the parallel moving amount employed in the transformation formula are those obtained in step 90. This transformation formula is applied to the respective coordinate value sequences to obtain transformed sequences. The order of the coordinate value sequences is stored.

In step 92, for each of the transformed sequences, the same process as step 5 according to the fourth embodiment is performed. Accordingly, when equal-division using the quantization precision is not employed, at most three space division functions are required.

In step 70, for each of the transformed sequences, the same process as step 70 according to the fourth embodiment is performed using inverse matrix functions of the space division functions used in step 92, generating code sequences. Also in the case of employing equal-division using the quantization error, the same process is carried out. At this time, the order of the code sequences is the same as the order of the original coordinate value sequences.

In step 12e, compressed data comprising the transformation parameters for the respective coordinates calculated in step 90, the arithmetic parameters specifying the space division function p, and the code sequences is output.

As described above, according to the sixth embodiment of the present invention, the three-dimensional coordinate point sequence read in step 2b is transformed to point sequences in a three-dimensional normal space in steps 90 and 91. Then, the three-dimensional normal space is divided into partial spaces (sub-intervals), and code sequences are generated for the respective coordinate value sequences using arithmetic expression. Therefore, shape data expressing an object having complicated surfaces can be compressed with high efficiency.

[Embodiment 7]

Figure 10:
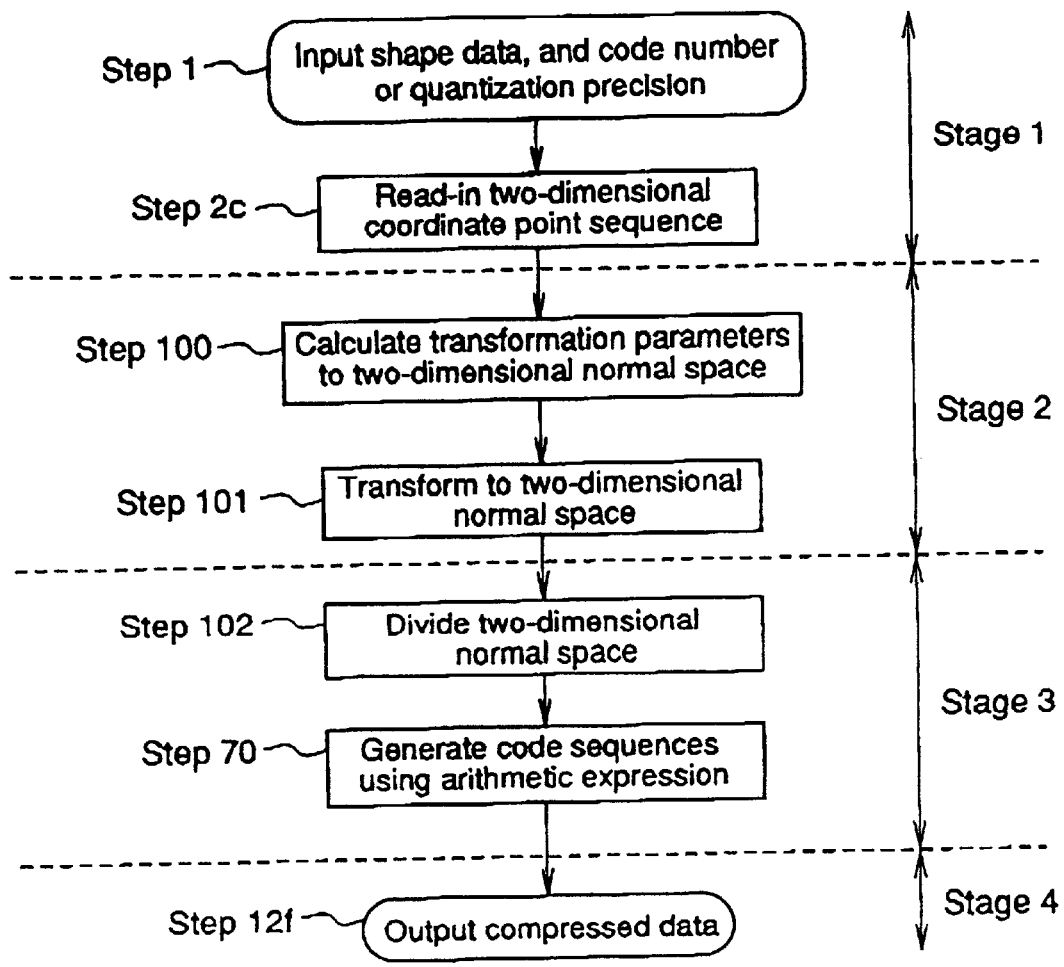
FIG. 10 is a flowchart of a shape data compression method according to a seventh embodiment of the invention.

A shape data compression method according to a seventh embodiment of the present invention will be described using FIG. 10. FIG. 10 is a flowchart for explaining process steps in the data compression method according to this seventh embodiment. In FIG. 10, the whole process consists of first to fourth stages. The first stage comprises steps 1 and 2c, the second stage comprises steps 100 and 101, the third stage comprises steps 102 and 70, and the fourth stage comprises step 12f.

Step 1 is carried out in the same manner as step 1 according to the first embodiment. However, the code number and the quantization error can be independently given to each coordinate value.

In step 2c, from the shape data, the two-dimensional coordinate point sequence is read as sequences of respective coordinate values. To be specific, in the shape data, the two-dimensional texture coordinate point sequence is regarded as the processing target, and reading is carried out so that the texture coordinate point sequence is divided into sequences of respective coordinate values. When plural data are mixed in the shape data, reading is carried out while identifying each data using identifiers given to the respective data.

In step 100, parameters for transforming the two-dimensional coordinate point sequences read in step 2c to a two-dimensional normal space [a,b]×[c,d] are calculated. The parameters are a parallel moving amount and a scale conversion amount. To obtain the parallel moving amount, a mean value of coordinate values in each coordinate value sequence is calculated, and (mean value of first coordinate)−(a+b)/2 and (mean value of second coordinate)−(c+d)/3 are given as a parallel moving amount for each coordinate value sequence. With respect to the scale conversion amount, a maximum value m of absolute values of coordinate values in each coordinate value sequence is obtained, and different scale conversion amounts are used for the respective coordinate values.

In step 101, the respective coordinate value sequences are transformed to a two-dimensional normal space, generating transformed point sequences. A transformation formula is given by (scale conversion amount)×x−(parallel moving amount), wherein x is the coordinate value to be transformed. The scale conversion amount and the parallel moving amount employed in the transformation formula are those obtained in step 100. This transformation formula is applied to the respective coordinate value sequences to obtain transformed sequences. The order of the coordinate value sequences is stored.

In step 102, for each of the transformed sequences, the same process as step 5 according to the fourth embodiment is performed. Accordingly, when equal-division using the quantization precision is not employed, at most two space division functions are required.

In step 70, for each of the transformed sequences, the same process as step 70 according to the fourth embodiment is performed using inverse matrix functions of the space division functions used in step 92, generating code sequences. Also in the case of employing equal-division using the quantization error, the same process is carried out. At this time, the order of the code sequences is the same as the order of the original coordinate value sequences.

In step 12f, compressed data comprising the transformation parameters for the respective coordinates calculated in step 100, the arithmetic parameters specifying the space division function p, and the code sequences is output.

As described above, according to the seventh embodiment of the invention, the two-dimensional coordinate point sequence read in step 2c is transformed to point sequences in a two-dimensional normal space in steps 100 and 101. Then, the two-dimensional normal space is divided into partial spaces (sub-intervals), and code sequences are generated for the respective coordinate value sequences using arithmetic expression. Therefore, shape data expressing an object having complicated surfaces can be compressed with high efficiency.

[Embodiment 8]

Figure 11:
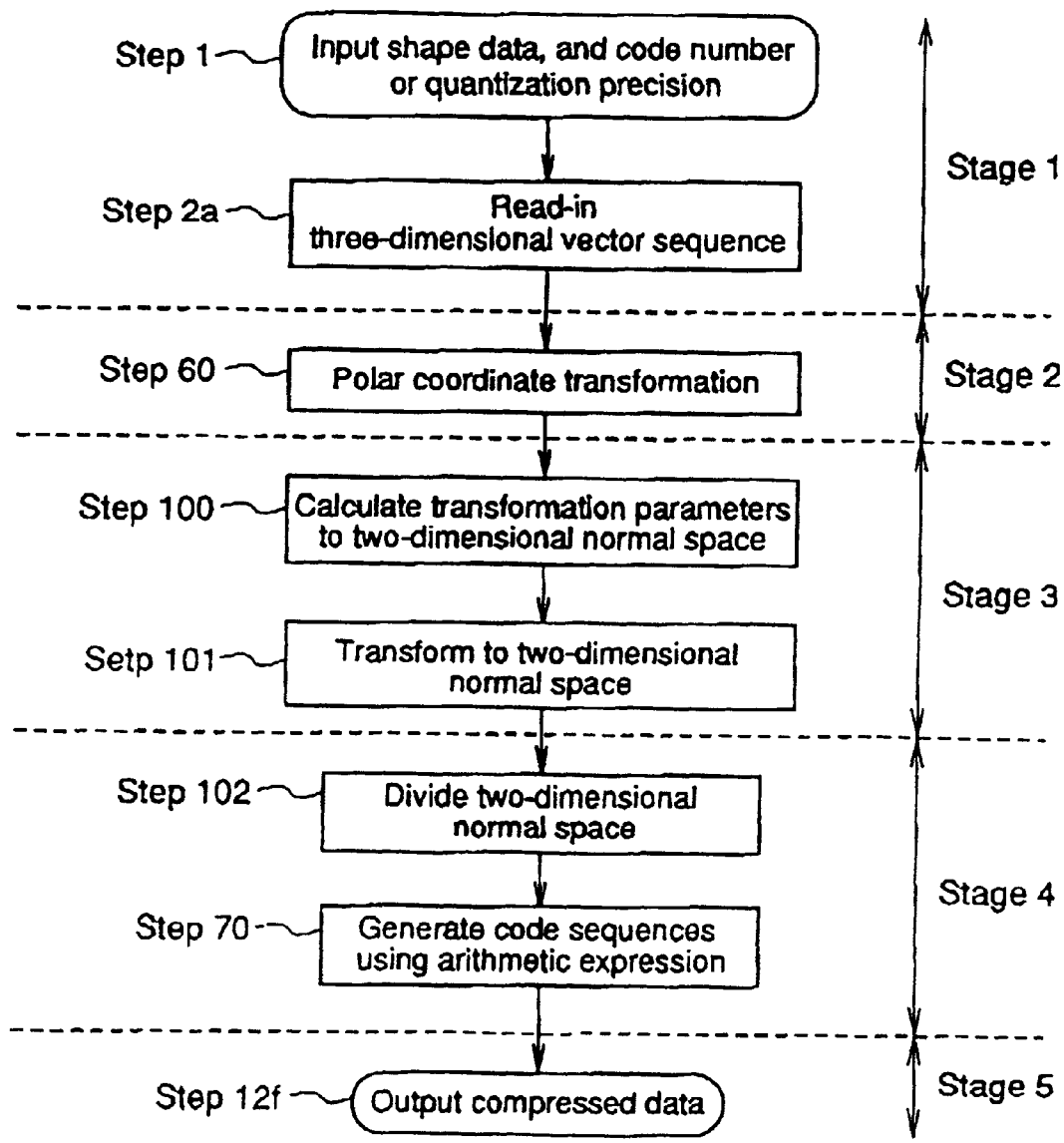
FIG. 11 is a flowchart of a shape data compression method according to an eighth embodiment of the invention.

A shape data compression method according to an eighth embodiment of the present invention will be described using FIG. 11. FIG. 11 is a flowchart for explaining process steps in the data compression method according to this eighth embodiment. In FIG. 11, the whole process consists of first to fifth stages. The first stage comprises steps 1 and 2a, the second stage comprises step 60, the third stage comprises steps 100 and 101, the fourth stage comprises steps 102 and 70, and the fifth stage comprises step 12f.

Steps 1 through 60 are identical to those already described for the third embodiment and, therefore, do not require repeated description.

In step 100, parameters for transforming the sequences of two angle data generated in step 60 to a two-dimensional normal space [a,b]×[c,d] are calculated. The parameters are a parallel moving amount and a scale conversion amount. To obtain the parallel moving amount, a mean value of angle data in each angle data sequence is calculated, and (mean value of first angle data sequence)−(a+b)/2 and (mean value of second angle data sequence)−(c+d)/3 are given as a parallel moving amount for each angle data sequence. With respect to the scale conversion amount, a maximum value m of absolute values of angle data in each angle data sequence is obtained, and different scale conversion amounts are used for the respective angle data sequences.

In step 101, the respective angle data sequences are transformed to a two-dimensional normal space, generating transformed point sequences. A transformation formula is given by (scale conversion amount)×x−(parallel moving amount), wherein x is the angle data value to be transformed. The scale conversion amount and the parallel moving amount employed in the transformation formula are those obtained in step 100. This transformation formula is applied to the respective angle data sequences to obtain transformed sequences. The order of the angle data sequences is stored.

Steps 102 through 12f are identical to steps 101 through 12f according to the seventh embodiment of the invention.

As described above, according to the eighth embodiment of the invention, the three-dimensional vector sequence read in step 2a is transformed to polar coordinates in step 60, and the polar coordinates are transformed to point sequences in a two-dimensional normal space in steps 100 and 101. Then, the two-dimensional normal space is divided into partial spaces (sub-intervals), and code sequences are generated for the respective coordinate value sequences using arithmetic expression. Therefore, shape data expressing an object having complicated surfaces can be compressed with high efficiency.

Figure 12:
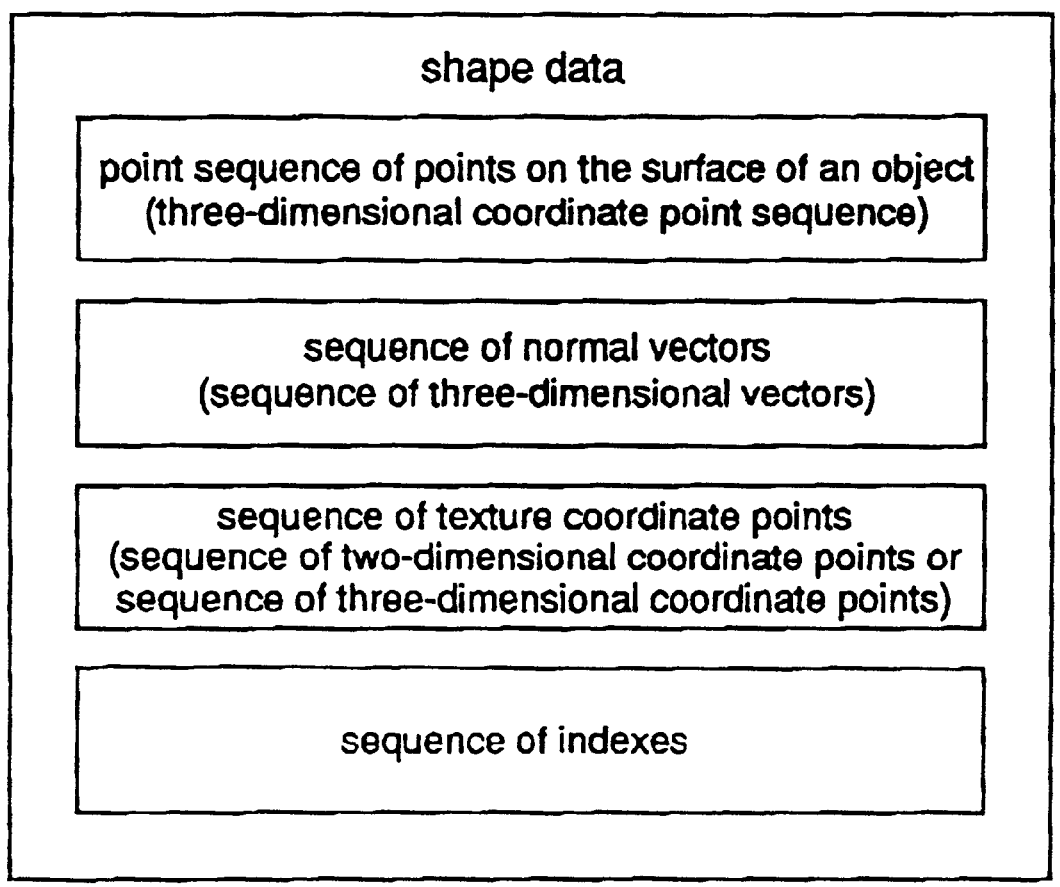
FIG. 12 is a diagram illustrating a structure of input shape data.
Figure 13:
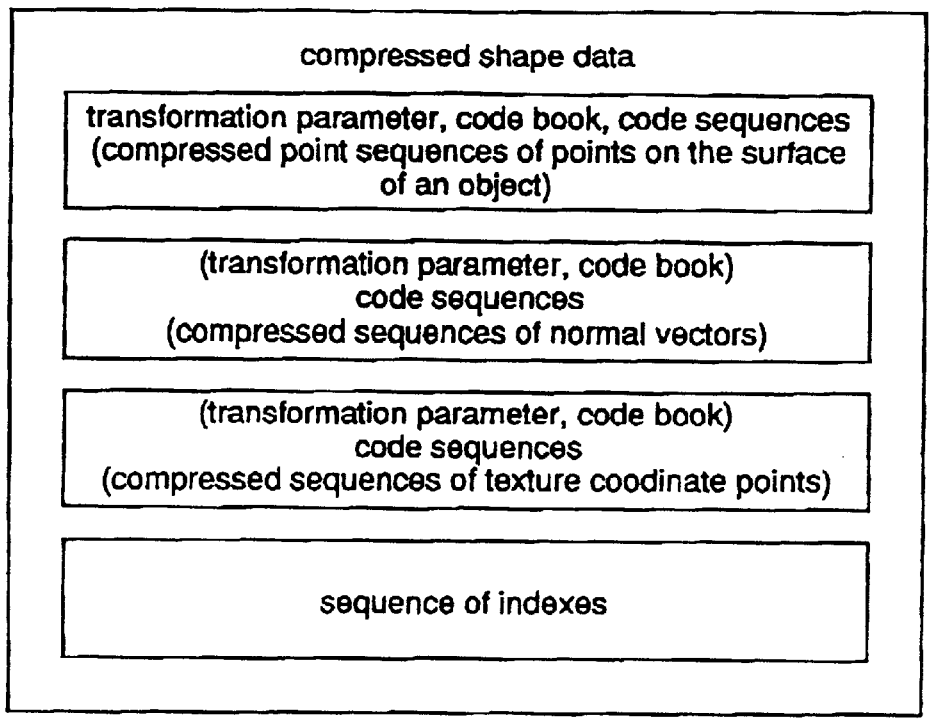
FIGS. 13(a) and 13(b) are diagrams illustrating structures of compressed shape data.
Figure 13:
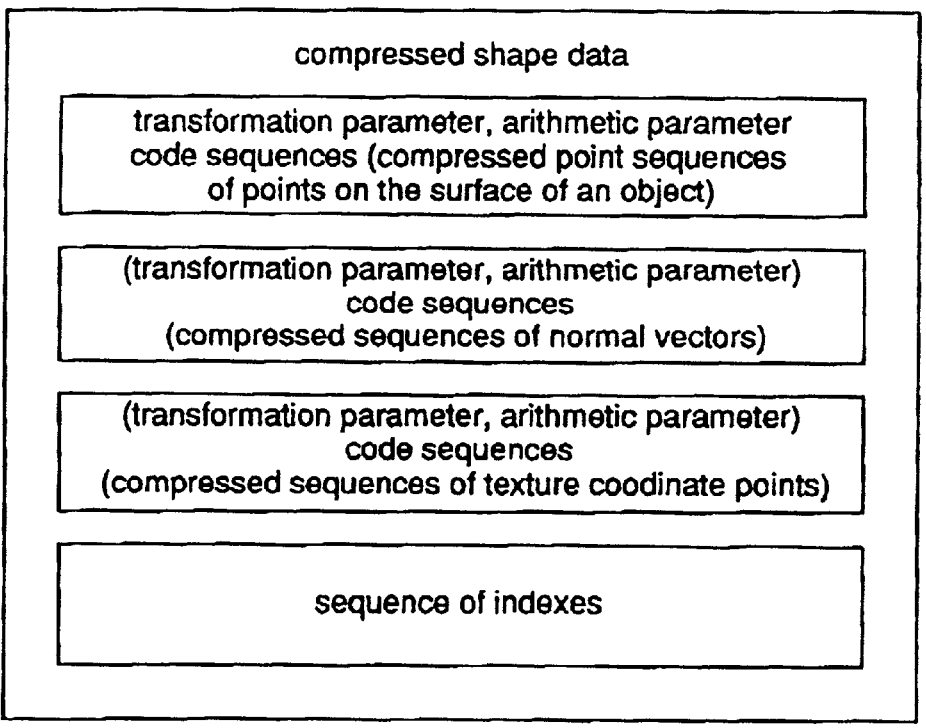

By appropriately combining the compression according to this eighth embodiment, in the shape data shown in FIG. 12, the three-dimensional coordinate point sequence on the surface of the object, the normal vector sequence, and the texture coordinate point sequence can be individually compressed. Therefore, for a piece of shape data, compressed shape data in a format shown in FIG. 13(*a*) or 13(*b*) can be output. Further, when applied to plural pieces of shape data, plural pieces of compressed shape data are obtained. However, when a common normal space and a common arithmetic expression are employed, arithmetic parameters shown in FIG. 13(*b*) can be removed from the compressed shape data on condition that an arithmetic parameter is separately stored.

When shape data has been compressed using a code book, decoding of the shape data is carried out according to the code book. In case of using arithmetic expression, a corresponding sub-interval is calculated from the code number as mentioned above, and a representative point (for example, a middle point) of the sub-interval is transformed using a space division function that can be calculated from the arithmetic parameter, whereby decoding is carried out. However, if the shape data has been subjected to run-length compression as well, ordinary decoding for the run-length compression must be carried out before the above-mentioned decoding.

[Embodiment 9]

Figure 15:
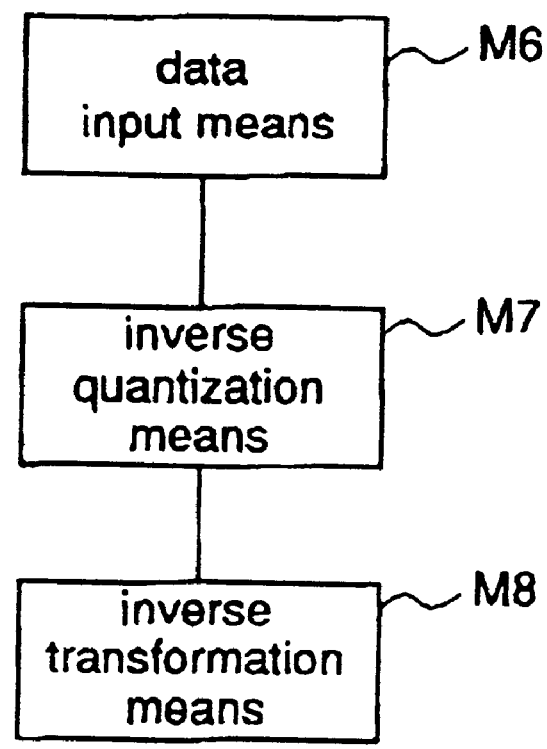
FIG. 15 is a block diagram showing a schematic structure of a shape data decompression apparatus according to a ninth embodiment of the invention.

A shape data decompression apparatus according to a ninth embodiment of the invention will be described with reference to FIG. 15 FIG. 15 is a block diagram illustrating a shape data decompression apparatus according to this ninth embodiment. In FIG. 15, a data input means M6 receives compressed data. An inverse quantization means M7 inversely quantizes the input compressed data using a code book or arithmetic expression employed in the data compression process. An inverse transformation means M8 inversely transforms the inversely quantized data to the original three-dimensional coordinate point sequence, two-dimensional coordinate point sequence, or three-dimensional vector sequence by performing an inverse process of the data transformation performed in the compression process.

Using the shape data decompression apparatus so constructed, shape data, which has been compressed by the shape data compression apparatus (method) according to any of the first to eighth embodiments, is decoded When shape data, which has been subjected to run-length compression as described for the second embodiment, is decoded, decompression of the run-length compression must be carried out before the inverse quantization.

In the aforementioned embodiments of the invention, the compression ratio is calculated on the assumption that binary data is output. However, even in case of outputting data in ASCII format, since the data, which is a real number, can be output as an integer equal to the code number, a code which is expressed by 9 bits for each coordinate is expressed as a number of three digits at most. So, when the original number is given by 8 significant digits, compression to $3/8$ is realized.

Furthermore, if high precision is not required of shape data after reproduction, the code number can be reduced, whereby the compression ratio is further increased. Consequently, according to the shape data compression method of the present invention, the compression ratio can be controlled by the code number or the quantization precision, and this is an advantage of the present invention.

What is claimed is:

1. A shape data compression method employed for image generation by three-dimensional computer graphics, in which shape data of an object given by one of a three-dimensional coordinate point sequence and a two-dimensional coordinate point sequence is processed, said method comprising:

first stage of inputting a code number and a quantization precision for encoding one of the three-dimensional coordinate point sequence data and the two-dimensional coordinate point sequence data, and reading the coordinate point sequence data;

second stage of mapping the coordinate point sequence data to transformed point sequences in a one-dimensional normal space [a,b] on the basis of transformation parameters;

third stage of calculating an initial space division width on the basis of the quantization precision, dividing the one-dimensional normal space into partial spaces using the initial space division width, analyzing distribution of the transformed point sequences in each partial space, deciding a division width by adaptively changing the initial division width so that the number of partial spaces where the distribution is not 0 is approximately equal to the code number, and calculating the distribution of the transformed point sequences in each partial space at the decided division width;

fourth stage of obtaining, for each of the partial spaces wherein the distribution is not 0, a mean value of coordinate values of transformed point sequences distributed in the partial space, and encoding the mean values to produce a code book;

fifth stage of encoding the transformed point sequences according to the code book to generate code sequences; and sixth stage of outputting compressed data comprising the transformation parameters used for the data mapping in the second stage, the code book, and the code sequences.

2. A shape data compression method employed for image generation by three-dimensional computer graphics, in which shape data of an object given by one of a three-dimensional coordinate point sequence and a two-dimensional coordinate point sequence is processed, said method comprising:

first stage of inputting a code number and a quantization precision for encoding one of the three-dimensional coordinate point sequence data and the two-dimensional coordinate point sequence data, and reading the coordinate point sequence data;

second stage of mapping the coordinate point sequence data to transformed point sequences in a one-dimensional normal space [a,b] on the basis of transformation parameters;

third stage of calculating an initial space division width on the basis of the quantization precision, dividing the one-dimensional normal space into partial spaces using the initial space division width, analyzing distribution of the transformed point sequences in each partial space, deciding a division width by adaptively changing the initial division width so that the number of partial spaces where the distribution is not 0 is approximately equal to the code number, and calculating the distribution of the transformed point sequences in each partial space at the decided division width;

fourth stage of obtaining, for each of the partial spaces wherein the distribution is not 0, a mean value of coordinate values of transformed point sequences distributed in the partial space, and encoding the mean values to produce a code book;

fifth stage of encoding the transformed point sequences according to the code book to generate code sequences;

sixth stage of performing run-length compression to the code sequences; and seventh stage of outputting compressed data comprising the transformation parameters used for the data mapping in the second stage, the code book, and the run-length compressed code sequences.

3. A shape data compression method employed for image generation by three-dimensional computer graphics, in which shape data of an object given by a three-dimensional vector sequence is processed, said method comprising:

first stage of inputting a code number and a quantization precision for encoding the three-dimensional vector sequence data, and reading the three-dimensional vector sequence data;

second stage of transforming the three-dimensional vector sequence data to data sequences of two angles obtained when expressed by polar coordinates;

third stage of mapping the angle data sequences to transformed point sequences in a one-dimensional normal space [a,b] on the basis of transformation parameters;

fourth stage of calculating an initial space division width on the basis of the quantization precision, dividing the one-dimensional normal space into partial spaces using the initial space division width, analyzing distribution of the transformed point sequences in each partial space, deciding a division width by adaptively changing the initial division width so that the number of partial spaces where the distribution is not 0 is approximately equal to the code number, and calculating the distribution of the transformed point sequences in each partial space at the decided division width;

fifth stage of obtaining, for each of the partial spaces wherein the distribution is not 0, a mean value of coordinate values of transformed point sequences distributed in the partial space, and encoding the mean values to produce a code book;

sixth stage of encoding the transformed point sequences according to the code book to generate code sequences; and seventh stage of outputting compressed data comprising the transformation parameters used for the data mapping in the third stage, the code book, and the code sequences.

4. A shape data compression method employed for image generation by three-dimensional computer graphics, in which shape data of an object given by a three-dimensional vector sequence is processed, said method comprising:

first stage of inputting a code number and a quantization precision for encoding the three-dimensional vector sequence data, and reading the three-dimensional vector sequence data;

second stage of transforming the three-dimensional vector sequence data to data sequences of two angles obtained when expressed by polar coordinates;

third stage of mapping the angle data sequences to transformed point sequences in a one-dimensional normal space [a,b] on the basis of transformation parameters;

fourth stage of calculating an initial space division width on the basis of the quantization precision, dividing the one-dimensional normal space into partial spaces using the initial space division width, analyzing distribution of the transformed point sequences in each partial space, deciding a division width by adaptively changing the initial division width so that the number of partial spaces where the distribution is not 0 is approximately equal to the code number, and calculating the distribution of the transformed point sequences in each partial space at the decided division width;

fifth stage of obtaining, for each of the partial spaces wherein the distribution is not 0, a mean value of coordinate values of transformed point sequences distributed in the partial space, and encoding the mean values to produce a code book;

sixth stage of encoding the transformed point sequences according to the code book to generate code sequences;

seventh stage of performing run-length compression of the code sequences;

eighth stage of outputting compressed data comprising the transformation parameters used for the data mapping in the third stage, the code book, and the run-length compressed code sequences.

5. A shape data compression method employed for image generation by three-dimensional computer graphics, in which shape data of an object given by one of a three-dimensional coordinate point sequence and a two-dimensional coordinate point sequence is processed, said method comprising:

first stage of inputting one of a code number and a quantization precision for encoding one of the three-dimensional coordinate point sequence data and the two-dimensional coordinate point sequence data, and reading the coordinate point sequence data;

second stage of mapping the coordinate point sequence data to transformed point sequences in a one-dimensional normal space [a,b] on the basis of transformation parameters;

third stage of calculating an initial space division width on the basis of the code number or the quantization precision, dividing the one-dimensional normal space into partial spaces using the initial space division width, encoding points in the transformed point sequences included in each partial space using an arithmetic expression to generate code sequences; and fourth stage of outputting compressed data comprising the transformation parameters employed for the data mapping in the second stage, parameters of the arithmetic expression employed in the third stage, and the code sequences.

6. A shape data compression method employed for image generation by three-dimensional computer graphics, in which shape data of an object given by one of a three-dimensional coordinate point sequence and a two-dimensional coordinate point sequence is processed, said method comprising:

first stage of inputting one of a code number and a quantization precision for encoding one of the three-dimensional coordinate point sequence data and the two-dimensional coordinate point sequence data, and reading the coordinate point sequence data;

second stage of mapping the coordinate point sequence data to transformed point sequences in a one-dimensional normal space [a,b] on the basis of transformation parameters;

third stage of calculating an initial space division width on the basis of the code number or the quantization precision, dividing the one-dimensional normal space into partial spaces using the initial space division width, encoding points in the transformed point sequences included in each partial space using an arithmetic expression to generate code sequences;

fourth stage of performing run-length compression to the code sequences; and fifth stage of outputting compressed data comprising the transformation parameters employed for the data mapping in the second stage, parameters of the arithmetic expression employed in the third stage, and the run-length compressed code sequences.

7. A shape data compression method employed for image generation by three-dimensional computer graphics, in which shape data of an object given by a three-dimensional vector sequence is processed, said method comprising:

first stage of inputting one of a code number and a quantization precision for encoding the three-dimensional vector sequence data, and reading the three-dimensional vector sequence data;

second stage of transforming the three-dimensional vector sequence data to data sequences of two angles obtained when expressed by polar coordinate;

third stage of mapping the angle data sequences to transformed point sequences in a one-dimensional normal space [a,b] on the basis of transformation parameters;

fourth stage of calculating an initial space division width on the basis of the code number or the quantization precision, dividing the one-dimensional normal space into partial spaces using the initial space division width, encoding points in the transformed point sequences included in each partial space using an arithmetic expression to generate code sequences; and fifth stage of outputting compressed data comprising the transformation parameters employed for the data mapping in the third stage, parameters of the arithmetic expression employed in the fourth stage, and the code sequences.

8. A shape data compression method employed for image generation by three-dimensional computer graphics, in which shape data of an object given by a three-dimensional vector sequence is processed, said method comprising:

first stage of inputting one of a code number and a quantization precision for encoding the three-dimensional vector sequence data, and reading the three-dimensional vector sequence data;

second stage of transforming the three-dimensional vector sequence data to data sequences of two angles obtained when expressed by polar coordinate;

third stage of mapping the angle data sequences to transformed point sequences in a one-dimensional normal space [a,b] on the basis of transformation parameters;

fourth stage of calculating an initial space division width on the basis of the code number or the quantization precision, dividing the one-dimensional normal space into partial spaces using the initial space division width, encoding points in the transformed point sequences included in each partial space using an arithmetic expression to generate code sequences;

fifth stage of performing run-length compression to the code sequences; and sixth stage of outputting compressed data comprising the transformation parameters employed for the data mapping in the third stage, parameters of the arithmetic expression employed in the fourth stage, and the run-length compressed code sequences.

9. A shape data compression method employed for image generation by three-dimensional computer graphics, in which shape data of an object given by a three-dimensional coordinate point sequence is processed, said method comprising:

first stage of inputting one of a code number and a quantization precision for encoding the three-dimensional coordinate point sequence data, and reading the three-dimensional coordinate point sequence data;

second stage of mapping the three-dimensional coordinate point sequence data to transformed coordinate point sequences in a three-dimensional normal space [a,b]×[c,d]×[e,f] on the basis of transformation parameters;

third stage of calculating an initial space division width on the basis of the code number or the quantization precision, dividing the three-dimensional normal space into partial spaces using the initial space division width, encoding points in the transformed point sequences included in each partial space using an arithmetic expression to generate code sequences; and fourth stage of outputting compressed data comprising the transformation parameters employed for the data mapping in the second stage, parameters of the arithmetic expression employed in the third stage, and the code sequences.

10. A shape data compression method employed for image generation by three-dimensional computer graphics, in which shape data of an object given by a three-dimensional coordinate point sequence is processed, said method comprising:

first stage of inputting one of a code number and a quantization precision for encoding the three-dimensional coordinate point sequence data, and reading the three-dimensional coordinate point sequence data;

second stage of mapping the three-dimensional coordinate point sequence data to transformed coordinate point sequences in a three-dimensional normal space [a,b]×[c,d]×[e,f] on the basis of transformation parameters;

third stage of calculating an initial space division width on the basis of the code number or the quantization precision, dividing the three-dimensional normal space into partial spaces using the initial space division width, encoding points in the transformed point sequences included in each partial space using an arithmetic expression to generate code sequences;

fourth stage of performing run-length compression to the code sequences; and fifth stage of outputting compressed data comprising the transformation parameters employed for the data mapping in the second stage, parameters of the arithmetic expression employed in the third stage, and the run-length compressed code sequences.

11. A shape data compression method employed for image generation by three-dimensional computer graphics, in which shape data of an object given by a two-dimensional coordinate point sequence is processed, said method comprising:

first stage of inputting one of a code number and a quantization precision for encoding the two-dimensional coordinate point sequence data, and reading the two-dimensional coordinate point sequence data;

second stage of mapping the two-dimensional coordinate point sequence data to transformed coordinate point sequences in a two-dimensional normal space [a,b]×[c,d] on the basis of transformation parameters;

third stage of calculating an initial space division width on the basis of the code number or the quantization precision, dividing the two-dimensional normal space into partial spaces using the initial space division width, encoding points in the transformed point sequences included in each partial space using an arithmetic expression to generate code sequences; and fourth stage of outputting compressed data comprising the transformation parameters employed for the data mapping in the second stage, parameters of the arithmetic expression employed in the third stage, and the code sequences.

12. A shape data compression method employed for image generation by three-dimensional computer graphics, in which shape data of an object given by a two-dimensional coordinate point sequence is processed, said method comprising:

first stage of inputting one of a code number and a quantization precision for encoding the two-dimensional coordinate point sequence data, and reading the two-dimensional coordinate point sequence data;

second stage of mapping the two-dimensional coordinate point sequence data to transformed coordinate point sequences in a two-dimensional normal space [a,b]×[c, d] on the basis of transformation parameters;

third stage of calculating an initial space division width on the basis of the code number or the quantization precision, dividing the two-dimensional normal space into partial spaces using the initial space division width, encoding points in the transformed point sequences included in each partial space using an arithmetic expression to generate code sequences;

fourth stage of performing run-length compression to the code sequences; and fifth stage of outputting compressed data comprising the transformation parameters employed for the data mapping in the second stage, parameters of the arithmetic expression employed in the third stage, and the run-length compressed code sequences.

13. A shape data compression method employed for image generation by three-dimensional computer graphics, in which shape data of an object given by a three-dimensional vector sequence is processed, said method comprising:

first stage of inputting one of a code number and a quantization precision for encoding the three-dimensional vector sequence data, and reading the three-dimensional vector sequence data;

second stage of transforming the three-dimensional vector sequence data to data sequences of two angles obtained when expressed by polar coordinate;

third stage of mapping the angle data sequences to transformed point sequences in a two-dimensional normal space [a,b]×[c,d] on the basis of transformation parameters;

fourth stage of calculating an initial space division width on the basis of the code number or the quantization precision, dividing the two-dimensional normal space into partial spaces using the initial space division width, encoding points in the transformed point sequences included in each partial space using an arithmetic expression to generate code sequences; and fifth stage of outputting compressed data comprising the transformation parameters employed for the data mapping in the third stage, parameters of the arithmetic expression employed in the fourth stage, and the code sequences.

14. A shape data compression method employed for image generation by three-dimensional computer graphics, in which shape data of an object given by a three-dimensional vector sequence is processed, said method comprising:

first stage of inputting one of a code number and a quantization precision for encoding the three-dimensional vector sequence data, and reading the three-dimensional vector sequence data;

second stage of transforming the three-dimensional vector sequence data to data sequences of two angles obtained when expressed by polar coordinate;

third stage of mapping the angle data sequences to transformed point sequences in a two-dimensional normal space [a,b]×[c,d] on the basis of transformation parameters;

fourth stage of calculating an initial space division width on the basis of the code number or the quantization precision, dividing the two-dimensional normal space into partial spaces using the initial space division width, encoding points in the transformed point sequences included in each partial space using an arithmetic expression to generate code sequences;

fifth stage of performing run-length compression to the code sequences; and sixth stage of outputting compressed data comprising the transformation parameters employed for the data mapping in the third stage, parameters of the arithmetic expression employed in the fourth stage, and the run-length compressed code sequences.

15. A shape data compression method according to claim 1 wherein a maximum value of absolute values of all the coordinate values is employed for scale conversion in the transformation to the one-dimensional normal space.

16. A shape data compression method according to claim 1 wherein a maximum value of absolute values of the respective coordinate values is employed for scale conversion in the transformation to the one-dimensional normal space.

17. A shape data compression method according to claim 1 wherein a mean value of the respective coordinate values is employed as a parallel moving amount in the transformation to the one-dimensional, two-dimensional, or three-dimensional normal space.

18. A shape data compression method according to claim 6 wherein an inverse function of a monotone increasing function is employed as an arithmetic expression for encoding.

19. A shape data compression method according to claim 5 wherein a common one-dimensional normal space and a common arithmetic expression are used for a plurality of shape data.

20. A shape data compression method according to claim 9 wherein a common two-dimensional or three-dimensional normal space and a common arithmetic expression are used for a plurality of shape data.

21. A shape data decompression method employed for image generation by three-dimensional computer graphics, said method comprising:

first stage of inversely transforming code sequences of compressed shape data of an object, using a code book which is used at encoding, to generate transformed point sequences mapped to a one-dimensional normal space [a,b]; and second stage of inversely mapping the transformed sequences obtained by the inverse transformation in the first stage, and outputting one of three-dimensional coordinate point sequence data and two-dimensional coordinate point sequence data.

22. A shape data decompression method according to claim 21 wherein the compressed shape data has been subjected to run-length compression, and the first stage includes, before the inverse transformation using the code book, a step of decompressing the run-length compressed shape data to restore the data to the compressed shape data before the run-length compression.

23. A shape data decompression method for decompressing compressed shape data of an object, employed for image generation by three-dimensional computer graphics:

wherein the compressed shape data is decompressed, the compressed shape data being obtained by, using an arithmetic expression, encoding points of transformed point sequences in each of partial spaces, into which a one-dimensional normal space is divided, the partial space having a division width determined by one of a code number and a quantization precision used at encoding; and said method comprising:

first stage of inversely transforming code sequences of the compressed shape data, using an arismatic expression that is an inverse of the arithmetic expression employed at encoding, to generate transformed point sequences mapped to a one-dimensional normal space [a,b]; and second stage of inversely mapping the transformed sequences obtained by the inverse transformation in the first stage, and outputting one of three-dimensional coordinate point sequence data and two-dimensional coordinate point sequence data.

24. A shape data compression apparatus for compressing shape data of an object, employed for image generation by three-dimensional computer graphics, said apparatus comprising:

data input means for inputting a code number and a quantization precision for encoding shape data expressed by one of a three-dimensional coordinate point sequence and a two-dimensional coordinate point sequence, and reading the coordinate point sequence data;

data mapping means for mapping the coordinate point sequence data to transformed point sequences in a one-dimensional normal space [a,b] on the basis of transformation parameters;

quantization means for calculating an initial space division width on the basis of the quantization precision, dividing the one-dimensional normal space into partial spaces using the initial space division width, analyzing distribution of the transformed point sequences in each partial space, deciding a division width by adaptively changing the initial division width so that the number of partial spaces where the distribution is not 0 is approximately equal to the code number, calculating the distribution of the transformed point sequences in each partial space at the decided division width, obtaining, for each of the partial spaces wherein the distribution is not 0, a mean value of coordinate values of transformed point sequences distributed in the partial space, and encoding the mean values to produce a code book;

encoding means for encoding the transformed point sequences according to the code book to generate code sequences; and data output means for outputting compressed data comprising the transformation parameters used by the data mapping means, the code book, and the code sequences.

25. The shape data compression apparatus of claim 24 further comprising run-length compression means for performing run-length compression to the code sequences output from the encoding means.

26. A shape data compression apparatus for compressing shape data of an object, employed for image generation by three-dimensional computer graphics, said apparatus comprising:

data input means for inputting a code number and a quantization precision for encoding shape data expressed by a three-dimensional vector sequence, and reading the three-dimensional vector sequence data;

polar coordinate transformation means for transforming the three-dimensional vector sequence data to data sequences of two angles obtained when expressed by polar coordinates;

data mapping means for mapping the angle data sequences to transformed point sequences in a one-dimensional normal space [a,b] on the basis of transformation parameters;

quantization means for calculating an initial space division width on the basis of the quantization precision, dividing the one-dimensional normal space into partial spaces using the initial space division width, analyzing distribution of the transformed point sequences in each partial space, deciding a division width by adaptively changing the initial division width so that the number of partial spaces where the distribution is not 0 is approximately equal to the code number, calculating the distribution of the transformed point sequences in each partial space at the decided division width, obtaining, for each of the partial spaces wherein the distribution is not 0, a mean value of coordinate values of transformed point sequences distributed in the partial space, and encoding the mean values to produce a code book;

encoding means for encoding the transformed point sequences according to the code book to generate code sequences; and data output means for outputting compressed data comprising the transformation parameters used by the data mapping means, the code book, and the code sequences.

27. The shape data compression apparatus of claim 26 further comprising run-length compression means for performing run-length compression to the code sequences output from the encoding means.

28. A shape data compression apparatus for compressing shape data of an object, employed for image generation by three-dimensional computer graphics, said apparatus comprising:

data input means for inputting one of a code number and a quantization precision for encoding shape data expressed by one of a three-dimensional coordinate point sequence and a two-dimensional coordinate point sequence, and reading the coordinate point sequence data;

data mapping means for mapping the coordinate point sequence data to transformed point sequences in a one-dimensional normal space [a,b] on the basis of transformation parameters;

quantization means for calculating an initial space division width on the basis of the code number or the quantization precision, dividing the one-dimensional normal space into partial spaces using the initial space division width, and encoding points in the transformed point sequences included in each partial space using an arithmetic expression to generate code sequences; and data output means for outputting compressed data comprising the transformation parameters employed by the data mapping means, parameters of the arithmetic expression employed for the encoding, and the code sequences.

29. The shape data compression apparatus of claim 28 further comprising run-length compression means for performing run-length compression to the code sequences output from the quantization means.

30. A shape data compression apparatus for compressing shape data of an object, employed for image generation by three-dimensional computer graphics, said apparatus comprising:

data input means for inputting one of a code number and a quantization precision for encoding shape data expressed by a three-dimensional vector sequence, and reading the three-dimensional vector sequence data;

polar coordinate transformation means for transforming the three-dimensional vector sequence data to data sequences of two angles obtained when expressed by polar coordinate;

data mapping means for mapping the angle data sequences to transformed point sequences in a one-dimensional normal space [a,b] on the basis of transformation parameters;

quantization means for calculating an initial space division width on the basis Of the code number or the quantization precision, dividing the one-dimensional normal space into partial spaces using the initial space division width, and encoding points in the transformed point sequences included in each partial space using an arithmetic expression to generate code sequences; and data output means for outputting compressed data comprising the transformation parameters employed by the data mapping means, parameters of the arithmetic expression employed for the encoding, and the code sequences.

31. The shape data compression apparatus of claim 30 further comprising run-length compression means for performing run-length compression to the code sequences output from the quantization means.

32. A shape data compression apparatus for compressing shape data of an object, employed for image generation by three-dimensional computer graphics, said apparatus comprising:

data input means for inputting one of a code number and a quantization precision for encoding shape data expressed by a three-dimensional coordinate point sequence, and reading the three-dimensional coordinate point sequence data;

data mapping means for mapping the three-dimensional coordinate point sequence data to transformed coordinate point sequences in a three-dimensional normal space [a,b]×[c,d]×[e,f] on the basis of transformation parameters;

quantization means for calculating an initial space division width on the basis of the code number or the quantization precision, dividing the three-dimensional normal space into partial spaces using the initial space division width, and encoding points in the transformed point sequences included in each partial space using an arithmetic expression to generate code sequences; and data output means for outputting compressed data comprising the transformation parameters employed by the data mapping means, parameters of the arithmetic expression employed for the encoding, and the code sequences.

33. The shape data compression apparatus of claim 32 further comprising run-length compression means for performing run-length compression to the code sequences output from the quantization means.

34. A shape data compression apparatus for compressing shape data of an object, employed for image generation by three-dimensional computer graphics, said apparatus comprising:

data input means for inputting one of a code number and a quantization precision for encoding shape data expressed by a two-dimensional coordinate point sequence, and reading the two-dimensional coordinate point sequence data;

data mapping means for mapping the two-dimensional coordinate point sequence data to transformed coordinate point sequences in a two-dimensional normal space [a,b]×[c,d] on the basis of transformation parameters;

quantization means for calculating an initial space division width on the basis of the code number or the quantization precision, dividing the two-dimensional normal space into partial spaces using the initial space division width, and encoding points in the transformed point sequences included in each partial space using an arithmetic expression to generate code sequences; and data output means for outputting compressed data comprising the transformation parameters employed by the data mapping means, parameters of the arithmetic expression employed for the encoding, and the code sequences.

35. The shape data compression apparatus of claim 34 further comprising run-length compression means for performing run-length compression to the code sequences output from the quantization means.

36. A shape data compression apparatus for compressing shape data of an object, employed for image generation by three-dimensional computer graphics, said apparatus comprising:

data input means for inputting one of a code number and a quantization precision for encoding shape data expressed by a three-dimensional vector sequence, and reading the three-dimensional vector sequence data;

polar coordinate transformation means for transforming the three-dimensional vector sequence data to data sequences of two angles obtained when expressed by polar coordinate;

data mapping means for mapping the angle data sequences to transformed point sequences in a two-dimensional normal space [a,b]×[c,d] on the basis of transformation parameters;

quantization means for calculating an initial space division width on the basis of the code number or the quantization precision, dividing the two-dimensional normal space into partial spaces using the initial space division width, and encoding points in the transformed point sequences included in each partial space using an arithmetic expression to generate code sequences; and data output means for outputting compressed data comprising the transformation parameters employed by the data mapping means, parameters of the arithmetic expression employed for the encoding, and the code sequences.

37. The shape data compression apparatus of claim 36 further comprising run-length compression means for performing run-length compression to the code sequences output from the quantization means.

38. A shape data decompression apparatus for decompressing compressed shape data of an object, employed for image generation by three-dimensional computer graphics, said apparatus comprising:

data input means for inputting compressed shape data of an object;

inverse transformation means for inversely transforming code sequences of the compressed shape data, using a code book which is used at encoding, to generate transformed point sequences mapped to a one-dimensional normal space [a,b]; and inverse quantization means for inversely mapping the transformed sequences obtained by the inverse transformation in the first stage, and outputting one of three-dimensional coordinate point sequence data and two-dimensional coordinate point sequence data.

39. The shape data decompression apparatus of claim 38 wherein the compressed shape data has been subjected to run-length compression, and the inverse transformation means performs, before the inverse transformation using the code book, decompression of the run-length compressed shape data to restore the data to the compressed shape data before the run-length compression.

40. A shape data decompression apparatus for decompressing compressed shape data of an object, employed for image generation by three-dimensional computer graphics:

wherein the compressed shape data is obtained by, using an arithmetic expression, encoding points of transformed point sequences in each of partial spaces, into which a one-dimensional normal space is divided, the partial space having a division width determined by one of a code number and a quantization precision used at encoding; and said apparatus comprising:

inverse transformation means for inversely transforming code sequences of the compressed shape data, using an arithmetic expression that is an inverse of the arithmetic expression employed at encoding, to generate transformed point sequences mapped to a one-dimensional normal space [a,b]; and inverse quantization means for inversely mapping the transformed sequences obtained by the inverse transformation in the first stage, and outputting one of three-dimensional coordinate point sequence data and two-dimensional coordinate point sequence data.

* * * * *